US010836934B2

(12) United States Patent
Rathore et al.

(10) Patent No.: US 10,836,934 B2
(45) Date of Patent: *Nov. 17, 2020

(54) PHOTO-RADICAL CURE OF SILICONES

(71) Applicant: 3M INNOVATIVE PROPERTIES COMPANY, St. Paul, MN (US)

(72) Inventors: Jitendra S. Rathore, Woodbury, MN (US); Babu N. Gaddam, Woodbury, MN (US); George W. Griesgraber, Eagan, MN (US); Kevin M. Lewandowski, Inver Grove Heights, MN (US); Stephen B. Roscoe, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/648,764

(22) PCT Filed: Sep. 14, 2018

(86) PCT No.: PCT/IB2018/057079
§ 371 (c)(1),
(2) Date: Mar. 19, 2020

(87) PCT Pub. No.: WO2019/064116
PCT Pub. Date: Apr. 4, 2019

(65) Prior Publication Data
US 2020/0248034 A1 Aug. 6, 2020

Related U.S. Application Data

(60) Provisional application No. 62/564,518, filed on Sep. 28, 2017.

(51) Int. Cl.
*C08F 2/46* (2006.01)
*C08F 2/50* (2006.01)
*C08G 61/04* (2006.01)
*C09J 7/25* (2018.01)
*C09J 7/38* (2018.01)
*C08G 77/388* (2006.01)
*C08J 5/18* (2006.01)

(52) U.S. Cl.
CPC .............. *C09J 7/25* (2018.01); *C08G 77/388* (2013.01); *C08J 5/18* (2013.01); *C09J 7/38* (2018.01); *C08J 2383/04* (2013.01); *C09J 2483/00* (2013.01)

(58) Field of Classification Search
CPC ...... C08F 293/005; C08F 293/00; C08F 2/50; C08F 2/38; C08F 287/00; C08F 265/04; C08F 222/10; C08F 220/18; C08F 2810/20; C08F 2438/03; C09J 4/06; C09J 11/08; C09J 7/387; C09J 2205/102; C09J 2205/114; C09J 2433/00; C09J 2453/00
USPC ........................ 522/6, 71, 189, 184, 1; 520/1
See application file for complete search history.

(56) References Cited

U.S. PATENT DOCUMENTS

| 4,181,752 | A | 1/1980 | Martens |
| 4,329,384 | A | 5/1982 | Vesley |
| 4,330,590 | A | 5/1982 | Vesley |
| 4,379,201 | A | 4/1983 | Heilmann |
| 5,214,119 | A | 5/1993 | Leir |
| 5,237,082 | A | 8/1993 | Leir |
| 5,264,278 | A | 11/1993 | Mazurek |
| 5,314,748 | A | 5/1994 | Mazurek |
| 5,506,279 | A | 4/1996 | Babu |
| 5,514,730 | A | 5/1996 | Mazurek |
| 5,773,485 | A | 6/1998 | Bennett |
| 5,773,836 | A | 6/1998 | Hartley |
| 7,241,437 | B2 | 7/2007 | Davidson |
| 7,371,464 | B2 | 5/2008 | Sherman |
| 7,417,099 | B2 | 8/2008 | Savu |
| 7,501,184 | B2 | 3/2009 | Leir |

(Continued)

FOREIGN PATENT DOCUMENTS

| EP | 0286376 | 10/1988 |
| EP | 0349270 | 1/1990 |

(Continued)

OTHER PUBLICATIONS

Destarac, "Madix Technology: From Innovative Concepts to Industrialization", Polymer Preprints, 2008, vol. 49, No. 02, pp. 179-180.
Mattioni, "Prediction of Glass Transition Temperatures from Monomer and Repeat Unit Structure Using Computational Neural Networks", Journal of Chemical Information and Computer Sciences, 2002, vol. 42, No. 02, pp. 232-240.
Moad, "RAFT Polymerization—Then and Now", American Chemical Society, Chapter 12, 2015, pp. 211-246.
Otsu, "Role of Initiator-Transfer Agent-Terminator (Iniferter) in Radical Polymerizations: Polymer Design by Organic Disulfides as Iniferters", Macromolecular Chem., Rapid Communications, 1982, vol. 03, No. 02, pp. 127-132.

(Continued)

*Primary Examiner* — Jessica Whiteley
(74) *Attorney, Agent, or Firm* — Jean A. Lown

(57) ABSTRACT

Silicone-based elastomeric materials, articles containing the silicone-based elastomeric materials, reaction mixtures used to form the silicone-based elastomeric materials, and methods of making the silicone-based elastomeric materials are described. The silicone-based elastomeric materials are prepared by polymerizing silicone compounds having at least two ethylenically unsaturated groups in the presence of actinic radiation and a controlled radical initiator. The controlled radical initiators are bis-dithiocarbamate or bis-dithiocarbonate compounds having a single carbon between the two dithiocarbamate or dithiocarbonate groups. The silicone-based elastomeric materials typically have improved mechanical properties compared to silicone-based elastomeric materials formed by free radical polymerization reactions in the presence of conventional photoinitiators.

14 Claims, No Drawings

(56) References Cited

U.S. PATENT DOCUMENTS

| | | | |
|---|---|---|---|
| 7,883,652 | B2 | 2/2011 | Leir |
| 7,947,376 | B2 | 5/2011 | Sherman |
| 8,236,429 | B2 | 8/2012 | Sherman |
| 8,492,486 | B2 | 7/2013 | Sherman |
| 8,586,668 | B2 | 11/2013 | Leir |
| 8,691,391 | B2 | 4/2014 | Sherman |
| 8,853,323 | B2 | 10/2014 | Leir |
| 9,206,290 | B2 | 12/2015 | Leir |
| 9,434,821 | B2 | 9/2016 | Leir |
| 2008/0187750 | A1 | 8/2008 | Sherman |
| 2014/0178698 | A1* | 6/2014 | Rathore ............... C09D 183/04 428/447 |
| 2015/0252235 | A1 | 9/2015 | Chatterjee |
| 2020/0017727 | A1* | 1/2020 | Lewandowski ........... C09J 4/06 |

FOREIGN PATENT DOCUMENTS

| | | |
|---|---|---|
| WO | WO 2009-085926 | 7/2009 |
| WO | WO 2011-119363 | 9/2011 |
| WO | WO 2014/099699 A1 | 6/2014 |
| WO | WO 2015-195355 | 12/2015 |
| WO | WO 2015-195391 | 12/2015 |
| WO | WO 2019-064117 | 4/2019 |

OTHER PUBLICATIONS

Taton, "Macromolecular Design by Interchange of Xanthates: Background, Design, Scope and Applications", Handbook of RAFT Polymerization, 2008, p. 373.

International Search Report for PCT International Application No. PCT/IB2018/057079, dated Dec. 10, 2018, 4 pages.

* cited by examiner

PHOTO-RADICAL CURE OF SILICONES

CROSS REFERENCE TO RELATED APPLICATIONS

This application is a national stage filing under 35 U.S.C. 371 of PCT/IB2018/057079, filed Sep. 14, 2018, which claims the benefit of U.S. Provisional Patent Application No. 62/564,518, filed Sep. 28, 2017, the disclosure of which is incorporated by reference herein in its/their entirety.

BACKGROUND

Silicone-based elastomeric materials have been prepared by curing a silicone having terminal ethylenically unsaturated groups with actinic radiation in the presence of a conventional photoinitiator (e.g., a Norrish type-1 photoinitiator) for free radical reactions. Advantageously, this curing method can occur in the absence of organic solvents and/or in the presence of heat-sensitive materials such as a heat-sensitive substrate. One disadvantage of this curing method, however, is that the resulting silicone-based elastomeric material often has poor mechanic properties.

Living controlled radical polymerization methods have been developed that allow the preparation of polymers with well-defined molecular weight, polydispersity, topology, composition, and microstructure. These methods are based on the use of special polymerization mediators, which temporarily and reversibly transform propagating radicals into dormant and/or stable species. The reversible transformations are typically either accomplished by reversible deactivation or by reversible chain transfer. Some of the methods that involve living controlled radical polymerization through reversible transformations include iniferter methods, nitroxide mediated polymerization (NMP) methods, atom transfer polymerization (ATRP) methods, and reversible addition-fragmentation (RAFT) methods.

The terms "iniferter" and "photoiniferter" refer to molecules that can act as an initiator, transfer agent, and terminator. Various iniferters were discussed in Otsu et al., Macromol. Chem., Rapid Commun., 3, 127-132 (1982). The compound p-xylene bis(N,N-diethyldithiocarbamate) (XDC) has been used to form various acrylic-based block copolymers such as those described in European Patent Applications 0286376 A2 (Otsu et al.) and 0349270 A2 (Mahfuza et al.).

SUMMARY

Silicone-based elastomeric materials, articles containing the silicone-based elastomeric materials, reaction mixtures used to form the silicone-based elastomeric materials, and methods of making the silicone-based elastomeric materials are described. The silicone-based elastomeric materials are prepared by polymerizing silicone compounds having at least two ethylenically unsaturated groups in the presence of actinic radiation and a controlled radical initiator. The controlled radical initiators are bis-dithiocarbamate or bis-dithiocarbonate compounds having a single carbon between the two dithiocarbamate or dithiocarbonate groups. The silicone-based elastomeric materials often have surprisingly improved mechanical properties compared to silicone-based elastomeric materials formed by free radical polymerization reactions in the presence of conventional photoinitiators such as Norrish type-1 photoinitiators.

In a first aspect, an elastomeric material that contains a reaction product (i.e., polymerized product) of a reaction mixture that includes (a) a silicone having at least two ethylenically unsaturated groups and (b) a photoinitiator of Formula (II) is provided.

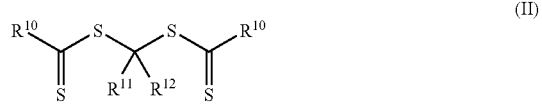

In Formula (II), each $R^{10}$ is an alkoxy, aryloxy, alkaryloxy, aralkyloxy, alkenoxy, or $-N(R^{13})_2$. Group $R^{11}$ is of formula $-(OR^{14})_p-OR^{15}$ or a group of formula $-(CO)-X-R^{16}$. Group $R^{12}$ is a hydrogen, alkyl, aryl, alkaryl, aralkyl, a group of formula $-(CO)OR^{17}$, or a group of formula $-(CO)N(R^{18})_2$. Each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R^{14}$ is an alkylene. $R^{15}$ is an alkyl and $R^{16}$ is hydrogen, alkyl, aryl, aralkyl, or alkaryl. Group $R^{17}$ is an alkyl, aryl, aralkyl, or alkaryl and each $R^{18}$ is an alkyl, aryl, aralkyl, or alkaryl. Group X is oxy or $-NR^{19}-$ and the variable p is an integer equal to at least 0. Group $R^{19}$ is hydrogen, alkyl, aryl, aralkyl, or alkaryl.

In a second aspect, an article that contains the silicone-based elastomeric material is provided. The silicone-based elastomeric material is the same as described above.

In a third aspect, a method of making an elastomeric material is provided. The method includes providing a reaction mixture that contains (a) a silicone having at least two ethylenically unsaturated groups and (b) a photoinitiator of Formula (I) as described above. The method still further includes exposing the reaction mixture to actinic radiation to form a silicone-based elastomeric material.

In a fourth aspect, a reaction mixture that contains (a) a silicone having at least two ethylenically unsaturated groups and (b) a photoinitiator of Formula (I) as described above is provided.

DETAILED DESCRIPTION

Silicone-based elastomeric materials, articles containing the silicone-based elastomeric materials, reaction mixtures used to form the silicone-based elastomeric materials, and methods of making the silicone-based elastomeric materials are described. The silicone-based elastomeric materials typically have improved mechanical properties compared to silicone-based elastomeric materials formed by free radical polymerization reactions in the presence of conventional Norrish type-1 photoinitiators.

The silicone-based elastomeric materials are prepared by polymerizing silicone compounds having at least two ethylenically unsaturated groups in the presence of actinic radiation and a controlled radical initiator. The controlled radical initiators are bis-dithiocarbamate or bis-dithiocarbonate compounds having a single carbon between the two dithiocarbamate or dithiocarbonate groups.

The controlled radical initiator compounds can be referred to as iniferters because they can function as a controlled radical initiator, transfer agent, and terminator. The controlled radical initiator compounds also can be referred to as photoinitiators or photoiniferters because the controlled radical polymerization reaction typically is photolytically induced.

The terms "a", "an", and "the" are used interchangeably with "at least one" to mean one or more of the elements being described.

The term "and/or" means either or both. For example, "A and/or B" means only A, only B, or both A and B.

The terms "silicone" and "silicone-based" are used interchangeably and refer to materials that contain one or more groups of formula —O—Si(R)$_2$—O— where R is a hydrocarbyl groups. In many embodiments, the silicone or silicone-based material has a polydiorganosiloxane group as defined below (see group Q').

The term "hydrocarbyl" refers to monovalent group that is a hydrocarbon. Examples, of hydrocarbyl groups include, but are not limited to, alkyl, aryl, aralkyl, alkaryl, and alkenyl.

The term "alkyl" refers to a monovalent group that is a radical of an alkane. The alkyl group can have 1 to 32 carbon atoms, 1 to 20 carbon atoms, 1 to 12 carbon atoms, 1 to 10 carbon atoms, 1 to 6 carbon atoms, or 1 to 4 carbon atoms. The alkyl can be linear, branched, cyclic, or a combination thereof. A linear alkyl has at least one carbon atoms while a cyclic or branched alkyl has at least 3 carbon atoms. In some embodiments, if there are greater than 12 carbon atoms, the alkyl is branched.

The term "alkoxy" refers to a monovalent group of formula —OR$^a$ where R$^a$ is an alkyl as defined above.

The term "alkylene" refers to a divalent group that is a radical of an alkane. The alkylene group can have 1 to 32 carbon atoms, 1 to 20 carbon atoms, 1 to 12 carbon atoms, 1 to 10 carbon atoms, 1 to 6 carbon atoms, or 1 to 4 carbon atoms. The alkylene can be linear, branched, cyclic, or a combination thereof. A linear alkylene has at least one carbon atoms while a cyclic or branched alkylene has at least 3 carbon atoms. In some embodiments, if there are greater than 12 carbon atoms, the alkyl is branched.

The term "alkenyl" refers to a monovalent group that is a radical of an alkene, which is a compound having at least one carbon-carbon double bond. In some embodiments, the alkenyl has a single carbon-carbon double bond. In some more specific embodiments, the alkenyl has an ethylenically unsaturated group (the carbon-carbon double bond is between the last two carbon atoms in a chain). The alkenyl has at least two carbon atoms and can have up to 20 carbon atoms, up to 16 carbon atoms, up to 12 carbon atoms, or up to 6 carbon atoms. The alkenyl can be linear, branched, or cyclic.

The term "alkenyloxy" refers to a monovalent group of formula —O—R$^b$ where R$^b$ is an alkenyl.

The term "aryl" refers to a monovalent group that is a radical of an aromatic carbocyclic compound. The aryl group has at least one aromatic carbocyclic ring and can have 1 to 5 optional rings that are connected to or fused to the aromatic carbocyclic ring. The additional rings can be aromatic, aliphatic, or a combination thereof. The aryl group usually has 5 to 20 carbon atoms or 6 to 10 carbon atoms.

The term "aryloxy" refers to a monovalent group that is of formula —OAr where Ar is an aryl group as defined above.

The term "aralkyl" refers to an alkyl group substituted with at least one aryl group. That is, the aralkyl group is of formula —R$^d$—Ar where R$^d$ is an alkylene and Ar is an aryl. The aralkyl group contains 6 to 40 carbon atoms. The aralkyl group often contains an alkylene group having 1 to 20 carbon atoms or 1 to 10 carbon atoms and an aryl group having 5 to 20 carbon atoms or 6 to 10 carbon atoms.

The term "aralkyloxy" refers to a monovalent group that is of formula —O—R$^d$—Ar with R$^d$ and Ar being the same as defined above for aralkyl.

The term "aralkylene" refers to a divalent group of formula —R$^d$—Ar$^a$— where R$^d$ is an alkylene and Ar$^a$ is an arylene. That is, an aralkylene is an alkylene bonded to an arylene. The alkylene often has 1 to 20 carbon atoms or 1 to 10 carbon atoms and the arylene often has 5 to 20 carbon atoms or 6 to 10 carbon atoms.

The term "alkaryl" refers to an aryl group substituted with at least one alkyl group. That is, the alkaryl group is of formula —Ar$^1$—R$^e$ where Ar$^1$ is an arylene and R$^e$ is an alkyl. The alkaryl group contains 6 to 40 carbon atoms. The alkaryl group often contain an arylene group having 5 to 20 carbon atoms or 6 to 10 carbon atoms and an alkyl group having 1 to 20 carbon atoms or 1 to 10 carbon atoms.

The term "alkaryloxy" refers to a monovalent group of formula —O—Ar$^1$—R$^e$ where Ar$^1$ and R$^e$ being the same as defined above for alkaryl.

The term "haloalkyl" refers to an alkyl that is substituted with at least one halo (e.g., chloro, bromo, or fluoro). The alkyl is the same as described above.

The term "carbonyloxy" and "oxycarbonyl" are both used to refers to a divalent group —(CO)—O— or —O—(CO)—.

The term "carbonylimino" and "iminocarbonyl" are both used to refer to a divalent group —(CO)—NH— or —NH—(CO)—.

The term "oxy" refer to the divalent group —O—.

The term "imino" refers to a divalent group —NH—.

The term "ethylenically unsaturated group" refers to a group of formula CH$_2$=CHR$^f$— where R$^f$ is hydrogen or an alkyl. Example ethylenically unsaturated groups can be vinyl groups (including vinyl ether groups) and (meth)acryloyl groups.

The term "(meth)acryloyl" refers to a group of formula CH$_2$=CH$^c$—(CO)— where R$^c$ is hydrogen or methyl and the group —(CO)— refers to a carbonyl group.

The term "(meth)acrylate" refers to an acrylate, a methacrylate, or both. Likewise, the term "(meth)acrylamide" refers to an acrylamide, a methacrylamide, or both and the term "(meth)acrylic acid" refers to acrylic acid, methacrylic acid, or both.

The term "heterocyclic ring" refers to a ring structure having at least 1 heteroatom selected from oxygen, nitrogen, or sulfur, wherein the ring structure is saturated or unsaturated. The heterocyclic ring typically has 5 to 7 ring atoms and 1 to 3 heteroatoms. The heterocyclic ring can optionally be fused to one or more second rings that are carbocyclic or heterocyclic and that can be saturated or unsaturated. Any of the rings can optionally be substituted with an alkyl group.

The term "halo" refers to fluoro, chloro, bromo, or iodo.

The term "haloalkyl" refers to an alkyl having at least one hydrogen atom replaced with a halo.

Some haloalkyl groups are fluoroalkyl groups, chloroalkyl groups, or bromoalkyl groups.

The term "oxy" refers to a divalent radical of oxygen.

The terms "in a range of" or "in the range of" are used interchangeably to refer to all values within the range plus the endpoints of the range.

Silicone Compound Having at Least Two Ethylenically Unsaturated Groups

The reaction mixtures used to form the silicone-based elastomeric material include a silicone having at least two ethylenically unsaturated groups. For example, the silicone can have two, three, four, or even more ethylenically unsaturated groups. In many embodiments, the ethylenically unsaturated group is a (meth)acryloyl group or a vinyl group, which include vinyl ether groups.

The silicone often has two ethylenically unsaturated groups and the ethylenically unsaturated groups are at the termini of the silicone compound. Such compounds are often of Formula (I).

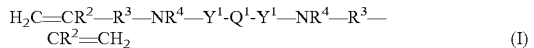
(I)

In Formula (I), $Q^1$ is a polydiorganosiloxane group and each $Y^1$ is an alkylene, arylene, aralkylene, or a combination thereof. Each $R^2$ is a hydrogen or methyl. Each $R^3$ is a single bond or is a divalent group selected from a carbonyl, carbonylimino, carbonyloxy, imino, oxy, alkylene, alkylene substituted with a hydroxyl group, aralkylene, and a combination thereof. Each $R^4$ is hydrogen or an alkyl.

The group $Q^1$ in Formula (I) is a polydiorganosiloxane group of formula

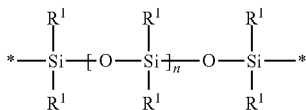

where each $R^1$ is independently an alkyl, haloalkyl, aralkyl, alkenyl, aryl, or aryl substituted with an alkyl, alkoxyl, or halo. The variable n is an integer in a range of 0 to 1500. The asterisks (*) are the location of attachment to other groups in the compound (i.e., groups $Y^1$ in the compound of Formula (I)).

Suitable alkyl groups for $R^1$ in the polydiorganosiloxane group $Q^1$ typically have 1 to 10, 1 to 6, or 1 to 4 carbon atoms. Exemplary alkyl groups include, but are not limited to, methyl, ethyl, isopropyl, n-propyl, n-butyl, and iso-butyl. Suitable haloalkyl groups for $R^1$ often have only a portion of the hydrogen atoms of the corresponding alkyl group replaced with a halogen. Exemplary haloalkyl groups include chloroalkyl and fluoroalkyl groups with 1 to 3 halo atoms and 3 to 10 carbon atoms. Suitable alkenyl groups for $R^1$ often have 2 to 10 carbon atoms. Exemplary alkenyl groups often have 2 to 8, 2 to 6, or 2 to 4 carbon atoms such as ethenyl, n-propenyl, and n-butenyl. Suitable aryl groups for $R^1$ often have 6 to 12 carbon atoms. Phenyl is an exemplary aryl group. The aryl group can be unsubstituted or substituted with an alkyl (e.g., an alkyl having 1 to 10 carbon atoms, 1 to 6 carbon atoms, or 1 to 4 carbon atoms), an alkoxy (e.g., an alkoxy having 1 to 10 carbon atoms, 1 to 6 carbon atoms, or 1 to 4 carbon atoms), or halo (e.g., chloro, bromo, or fluoro). Suitable aralkyl groups for $R^1$ usually have an alkylene group with 1 to 10 carbon atoms and an aryl group with 6 to 12 carbon atoms. In some exemplary aralkyl groups, the aryl group is phenyl and the alkylene group has 1 to 10 carbon atoms, 1 to 6 carbon atoms, or 1 to 4 carbon atoms (i.e., the structure of the aralkyl is alkylene-phenyl where an alkylene is bonded to a phenyl group).

In some polydiorganosiloxane groups, at least 50 percent of the $R^1$ groups are methyl. For example, at least 60 percent, at least 70 percent, at least 80 percent, at least 90 percent, at least 95 percent, at least 98 percent, at least 99 percent, or all the $R^1$ groups can be methyl. The remaining $R^1$ groups can be selected from an alkyl having at least two carbon atoms, haloalkyl, aralkyl, alkenyl, aryl, or aryl substituted with an alkyl, alkoxy, or halo.

In many embodiments, $Q^1$ is a polydimethylsiloxane group.

Each subscript n in the polydiorganosiloxane group $Q^1$ is independently an integer of 0 to 1500. For example, subscript n can be an integer up to 1000, up to 500, up to 400, up to 300, up to 200, up to 100, up to 80, up to 60, up to 40, up to 20, or up to 10. The value of n is often at least 1, at least 2, at least 3, at least 5, at least 10, at least 20, or at least 40. For example, subscript n can be in the range of 40 to 1500, 0 to 1000, 40 to 1000, 0 to 500, 1 to 500, 40 to 500, 1 to 400, 1 to 300, 1 to 200, 1 to 100, 1 to 80, 1 to 40, or 1 to 20.

Each $Y^1$ in Formula (I) is independently an alkylene, aralkylene, or a combination thereof. Suitable alkylene groups typically have up to 10 carbon atoms, up to 8 carbon atoms, up to 6 carbon atoms, or up to 4 carbon atoms. Exemplary alkylene groups include methylene, ethylene, propylene, butylene, and the like. Suitable aralkylene groups usually have an arylene group with 6 to 12 carbon atoms bonded to an alkylene group with 1 to 10 carbon atoms. In some exemplary aralkylene groups, the arylene portion is phenylene. That is, the divalent aralkylene group is phenylene-alkylene where the phenylene is bonded to an alkylene having 1 to 10, 1 to 8, 1 to 6, or 1 to 4 carbon atoms. As used herein for group Y, "a combination thereof" refers to a combination of two or more groups selected from an alkylene and aralkylene group. A combination can be, for example, a single aralkylene bonded to a single alkylene (e.g., alkylene-arylene-alkylene). In one exemplary alkylene-arylene-alkylene combination, the arylene is phenylene and each alkylene has 1 to 10, 1 to 6, or 1 to 4 carbon atoms. In some specific compounds of Formula (I), the group $Y^1$ is an alkylene such as, for example, propylene.

Each $R^3$ is a single bond or is a divalent group that is a carbonyl, carbonylimino, carbonyloxy, imino, oxy, alkylene, alkylene substituted with a hydroxyl group, aralkylene, or a combination thereof. Suitable alkylene, aralkylene, and combinations thereof are the same as defined in group $Y^1$.

Each $R^4$ is hydrogen or an alkyl such as an alkyl having 1 to 10 carbon atoms, 1 to 6 carbon atoms, or 1 to 4 carbon atoms.

The silicone material having at least two ethylenically unsaturated groups often has a weight average molecular weight in a range of 500 Daltons (Da) to 200,000 Da. The weight average molecular weight can be at least 750 Da, at least 1,000 Da, at least 2,000 Da, at least 5,000 Da, at least 10,000 Da, or at least 20,000 Da. The weight average molecular weight can be up to 175,000 Da, up to 150,000 Da, up to 125,000 Da, up to 100,000 Da, up to 75,000 Da, up to 70,000 Da, up to 60,000 Da, or up to 50,000 Da. In some embodiments, the molecular weight is in a range of 1,000 to 150,000 Da, in a range of 2,000 to 125,000 Da, in a range of 3,000 to 100,000 Da, in a range of 4,000 to 75,000 Da, or in a range of 5,000 to 70,000 Da.

There are various methods that can be used to prepare the silicone having at least two ethylenically unsaturated groups such as those of Formula (I). In many embodiments, a polydiorganosiloxane diamine of formula $HR^4N—Y^1-Q^1-Y^1—NR^4H$ is reacted with an ethylenically unsaturated reagent compound. The groups $R^4$, $Y^1$ and $Q^1$ are the same as defined above. The ethylenically unsaturated reagent compound has (a) a group that reacts with a primary and/or secondary amine group (—$NR^4H$) and (b) an ethylenically unsaturated group. The group that reacts with a primary and/or secondary amine group is often a isocyanato group (—NCO), an ester group (—(CO)—O—), an anhydride group (—(CO)—O—(CO)—), or a oxirane group.

In one method, the ethylenically unsaturated reagent compound has (a) an anhydride group and (b) a (meth)acryloyloxy group. For example, the ethylenically unsaturated reagent compound can be acryloyl ethyl carbonic anhydride. The reaction of this ethylenically unsaturated reagent compound with a polydiorganosiloxane diamine is shown in Reaction Scheme A.

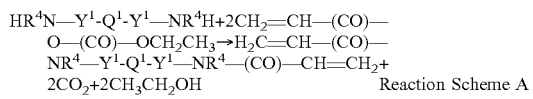
                                                                                                        Reaction Scheme A The resulting compound is of Formula (I) where $R^2$ is hydrogen and $R^3$ is a carbonyl group. In many examples, $Y^1$ is propylene, $R^4$ is hydrogen, and $Q^1$ is a polydimethylsiloxane.

In another method, the ethylenically unsaturated reagent compound has (a) an acid chloride group and (b) a (meth)acryloyloxy group. For example, the ethylenically unsaturated reagent compound can be (meth)acryloyl acid chloride. The reaction of this ethylenically unsaturated reagent compound with a polydiorganosiloxane diamine is shown in Reaction Scheme B.

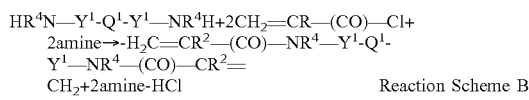
                                                                                                         Reaction Scheme B An amine such as a trialkylamine or pyridine is present to neutralize the hydrochloric acid that is generated. The resulting compound is of Formula (I) where $R^2$ is hydrogen or methyl and $R^3$ is a carbonyl group. In many examples, $Y^1$ is propylene, $R^4$ is hydrogen, and $Q^1$ is a polydimethylsiloxane.

In another method, the ethylenically unsaturated reagent compound that is reacted with a polydiorganosiloxane diamine has (a) a carbonyloxy group and (b) a vinyl group. In one example, the ethylenically unsaturated reagent compound is a vinyl azlactone. The reaction of this ethylenically unsaturated reagent compound with a polydiorganosiloxane diamine is shown in Reaction Scheme C.

The resulting compound is of Formula (I) where $R^2$ is hydrogen and $R^3$ is —(CO)—NH—C(CH$_3$)$_2$—(CO)—, which is a combination of carbonylimino, alkylene, and carbonyl groups. In many examples, $Y^1$ is propylene, $R^4$ is hydrogen, and $Q^1$ is a polydimethylsiloxane.

In still another method, the ethylenically unsaturated reagent compound has (a) an isocyanato (—NCO) group and (b) a (meth)acryloyloxy group. For example, the ethylenically unsaturated compound is 2-isocyanatoethyl methacrylate. The reaction of this ethylenically unsaturated reagent compound with a polydiorganosiloxane diamine is shown in Reaction Scheme D.

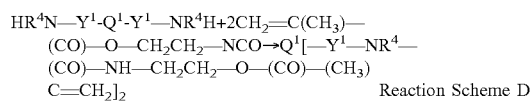
                                                                                       Reaction Scheme D The resulting compound is of Formula (I) where $R^2$ is methyl and $R^3$ is —(CO)—O—CH$_2$CH$_2$—NH—(CO)—, which is a combination of carbonyloxy, alkylene, and carbonylimino groups. In many examples, $Y^1$ is propylene, $R^4$ is hydrogen, and $Q^1$ is a polydimethylsiloxane.

In yet another method, the ethylenically unsaturated reagent compound has (a) an isocyanato (—NCO) group and (b) a vinyl group. For example, the ethylenically unsaturated compound is 3-isopentyl-α-α-dimethylbenzyl isocyanate. The reaction of this ethylenically unsaturated reagent compound with a polydiorganosiloxane diamine is shown in Reaction Scheme E where Ph is phenylene.

Reaction Scheme C

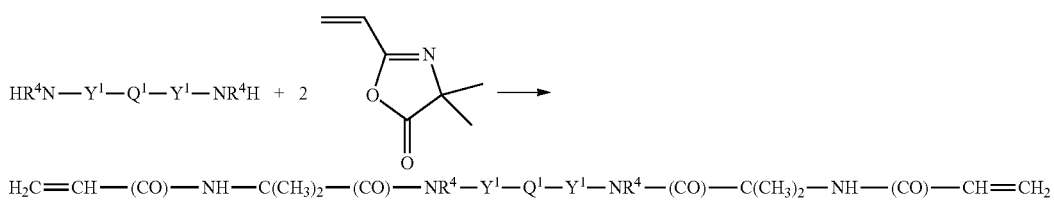

Reaction Scheme E

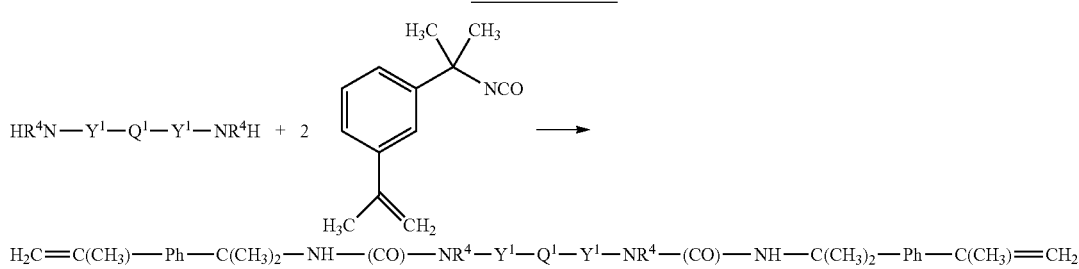

This compound is of Formula (I) where $R^2$ is methyl and $R^3$ is -Ph-C(CH$_3$)$_2$—NH—(CO)—, which is a combination of aralkylene and carbonylimino groups. In many examples, $Y^1$ is propylene, $R^4$ is hydrogen, and $Q^1$ is a polydimethylsiloxane.

In yet another method, the ethylenically unsaturated reagent compound has (a) an oxirane group and (b) a (meth)acryloyloxy group. One such ethylenically unsaturated compound is glycidyl (meth)acrylate. The reaction of this ethylenically unsaturated reagent compound with a polydiorganosiloxane diamine is shown in Reaction Scheme F.

Reaction Scheme F

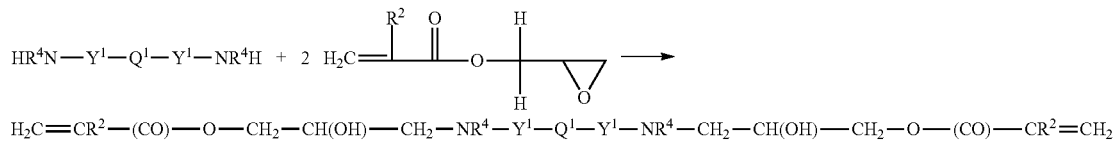

This compound is of Formula (I) where $R^3$ is —(CO)—O—CH$_2$—CH(OH)—CH$_2$—, which is a combination of carbonyloxy and an alkylene substituted with a hydroxyl group. In many examples, $Y^1$ is propylene, $R^4$ is hydrogen, and $Q^1$ is a polydimethylsiloxane.

The polydiorganosiloxane diamines of formula HR$^4$N—Y$^1$-Q$^1$-Y$^1$—NR$^4$H can be formed using methods such as those described, for example, in U.S. Pat. No. 5,314,748 (Mazurek et al.), U.S. Pat. No. 5,514,730 (Mazurek et al.), U.S. Pat. No. 5,237,082 (Leir et al.), and U.S. Pat. No. 5,264,278 (Mazurek et al.).

Polydiorganosiloxane diamines also are commercially available from Gelest, Inc. (Morrisville, Pa., USA) under the trade designations DMS-A11 (molecular weight 850 to 900 Da), DMS-A32 (molecular weight about 30,000 Da), and DMS-A35 (molecular weight about 50,000 Da) and from Wacker Chemicals Corp. (New York, N.Y., USA) under the trade designations WACKER FLUID (e.g., WACKER FLUID NH 130 D (molecular weight 9,500 to 12,000 Da), NH 30 D (molecular weight 2400 to 3400 Da), and NH 15 D (950 to 1200 Da)).

In many embodiments, the polydiorganosiloxanes are aminopropyl terminated polydimethylsiloxanes. That is, $Y^1$ is equal to propylene and each IV is methyl in the polydiorganosiloxane group $Q^1$ of the compounds of formula HR$^4$N—Y$^1$-Q$^1$-Y$^1$—NR$^4$H (i.e., $Q^1$ is a polydimethylsiloxane). Often, group $R^4$ is hydrogen (i.e., the aminopropyl terminated polydimethylsiloxanes have two primary amino groups).

Polydiorganosiloxanes with two terminal (meth)acryloyl groups are commercially available from Gelest, Inc. under the trade designations DMS-U21 ((3-acryloxy-2-hydroxypropoxypropyl) terminated polydimethylsiloxane with molecular weight in the range of 600 to 900 Da), DMS-R11 (methacryloxypropyl terminated dimethylsiloxane with molecular weight of 900 to 1200 Da), DMS-R18 (methacryloxypropyl terminated dimethylsiloxane with molecular weight of 4,500 to 5,500 Da), DMS-R22 (methacryloxypropyl terminated dimethylsiloxane with molecular weight of about 10,000 Da), and DMS-R31 (methacryloxypropyl terminated dimethylsiloxane with molecular weight of about 25,000 Da). Other polydiorganosiloxanes with at least two (meth)acryloyl groups are available from Evonik Corp. (Richmond, Va., USA) under the trade designations TEGO (e.g., TEGO RC 711, RC 902, and RC 715, which are acrylated terminated silicones that have various molecular weights) and from Siltech Corporation, Toronto, Ontario (Canada) under the trade designation SILMER (e.g., SILMER ACR D208, ACR Di-50, ACR Di-1508, ACR Di-2510, ACR Di-4515-0, ACR Di-10, OH ACR Di-10, OH ACR Di-50, OH ACR Di-100, OH ACR Di-400, and OH ACR C50.

The reaction mixture used to prepare the elastomeric silicone-based material often contains at least 60 weight percent of the silicone having at least two ethylenically unsaturated groups. If the amount is too low, the cured composition might not be sufficiently elastomeric. The amount is often at least 60 weight percent, at least 65 weight percent, at least 70 weight percent, at least 75 weight percent, or at least 80 weight percent. The amount can be up to 99.9 weight percent or greater, up to 99.5 weight percent, up to 99 weight percent, up to 98 weight percent, up to 97 weight percent, up to 95 weight percent, up to 90 weight percent, up to 85 weight percent, or up to 80 weight percent. These amounts are based on the solid content of the reaction mixture (i.e., the amounts do not consider any organic solvent that may be added).

Optional Silicone Compound Having a Single Ethylenically Unsaturated Group

A silicone compound having a single ethylenically unsaturated group optionally can be included in the reaction mixture in addition to the silicone having at least two ethylenically unsaturated groups. The addition of the silicone compound having a single ethylenically unsaturated group can increase the tackiness and/or flexibility of the resulting elastomeric silicone-based material.

Silicones having a single ethylenically unsaturated group can be prepared in a similar manner to the methods described above for preparing the silicone having at least two ethylenically unsaturated groups. Rather than reacting a silicone having at least two amino groups with the ethylenically unsaturated reagent compound, a silicone having a single amino group is used.

The silicone having a single amino group is often of Formula (III).

The corresponding silicone having a single ethylenically unsaturated group is often of Formula (IV).

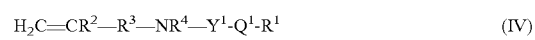

As in Formula (I), $R^1$ is an alkyl, haloalkyl, aralkyl, alkenyl, aryl, or aryl substituted with an alkyl, alkoxy, or halo; $Q^1$ is a polydiorganosiloxane group; each $Y^1$ is an alkylene, arylene, aralkylene, or a combination thereof; each $R^2$ is a hydrogen or methyl; each $R^3$ is a single bond or is a divalent group that is a carbonyl, carbonylimino, carbonyloxy, imino, oxy, alkylene, alkylene substituted with a hydroxyl group, aralkylene, or a combination thereof; and each $R^4$ is hydrogen or an alkyl.

The weight average molecular weight (e.g., weight average molecular weight) of the silicone having a single ethylenically unsaturated group is often in a range of 500 to 20,000 Da. The molecular weight can be at least 750 Da, at least 1000 Da, at least 1500 Da, at least 2000 Da, at least 5000 Da, at least 7500 Da, or at least 10,000 Da and can be up to 18,000 Da, up to 15,000 Da, up to 12,000 Da, up to 10,000 Da, up to 7500 Da, or up to 5000 Da. The molecular weight can be, for example, in a range of 1000 to 20,000 Da, in a range of 2000 to 20,000 Da, in a range of 5000 to 20,000 Da, in a range of 10,000 to 20,000 Da, in a range of 1000 to 15,000 Da, in a range of 1000 to 10,000 Da, or in a range of 1000 to 5000 Da.

Silicones having a single amino group are commercially available from Gelest, Inc. (Morrisville, Pa., USA) under the trade designation MCR-A11 (molecular weight is in a range of 800 to 1,200 Da) and MCR-A12 (molecular weight about 2,000 Da). These compounds are mono-aminopropyl terminated polydimethylsiloxanes. That is, $R^1$ is methyl, $R^4$ is hydrogen, and $Y^1$ is propylene.

Silicones having a single ethylenically unsaturated group are commercially available from Gelest, Inc. under the trade designation MCR-M11 (molecular weight is in a range of 800 to 1000 Da), MCR-M17 (molecular weight about 5000 Da), and MCR-M22 (molecular weight about 10,000 Da).

The amount of silicone having a single ethylenically unsaturated group in the reaction mixture used to form the silicone-based elastomeric material is in a range of 0 to 25 weight percent. If added, the amount is often at least 1 weight percent, at least 2 weight percent, at least 3 weight percent, at least 5 weight percent, or at least 10 weight percent. The amount can be up to 25 weight percent, up to 20 weight percent, up to 15 weight percent, or up to 10 weight percent. The amount can be in a range of 1 to 25 weight percent, 5 to 25 weight percent, 10 to 25 weight percent, 0 to 20 weight percent, 1 to 20 weight percent, 5 to 20 weight percent, 10 to 20 weight percent, 1 to 15 weight percent, 0 to 10 weight percent, or 1 to 10 weight percent. The amount is based on the solids content of the reaction mixture.

Optional Filler

The reaction mixture used to form the silicone-based elastomeric material can contain an optional filler. Often, the fillers are inorganic oxide particles. Adding such a filler can enhance the mechanical properties (e.g., films can be more resistant to tearing) or to provide other desirable characteristics to the resulting silicone elastomeric material.

Examples of suitable inorganic oxide particles include, but are not limited to, oxides of silicon, titanium, aluminum, zirconium, zinc, antimony, geranium, cerium, vanadium, tin, indium, iron, and the like. The inorganic oxide particles can be of any desired size. For example, the inorganic oxide particles can have an average longest dimension in a range of 1 nanometer to 10 micrometers. If clarity is desired, the filler is typically selected to have an average longest dimension that is no greater than 1000 nanometer, no greater than 500 nanometers, no greater than 200 nanometers, no greater than 100 nanometers, no greater than 50 nanometers, or no greater than 20 nanometers. The average particle size can be determined, for example, using various techniques such as scanning or transmission electron microscopy.

In some embodiments, the inorganic oxide is silica. The silica can be in the form of a silica sol having an average particle size no greater than 100 nanometers. Alternatively, the silica can be in the form of aggregates such as fumed silica. Fumed silica and silica sols are commercially available in a variety of sizes from multiple suppliers.

In some embodiments that include inorganic oxide particles, these particles are surface modified by treating them with a surface modification agent. Surface modification can improve compatibility of the inorganic oxide particle with the silicone-based elastomeric material. Surface modification agents may be represented by the formula A-B where the A group can attach to the surface of the inorganic oxide particle and where B is a compatibilizing group. The A group can be attached to the surface by adsorption, formation of an ionic bond, formation of a covalent bond, or a combination thereof. Suitable examples of A groups include, for example, carboxylic acid groups or salts thereof, sulfonic acid groups or salts thereof, phosphoric acid groups or salts thereof, phosphonic acid groups and salts thereof, silyl groups, and the like. The compatabilizing group B can be reactive or nonreactive and polar or non-polar.

Compatibilizing groups B that can impart polar character to the inorganic oxide particles include, for example, polyether groups. Representative examples of polar modifying agents having carboxylic acid functionality include MEEAA, MEAA, and mono(polyethylene glycol)succinate.

Compatibilizing groups B that can impart non-polar character to the inorganic oxide particles include, for example, linear or branched aromatic or aliphatic hydrocarbon groups. Representative examples of non-polar modifying agents having carboxylic acid functionality include octanoic acid, dodecanoic acid, stearic acid, oleic acid, and combinations thereof.

Exemplary silane surface modifying agents include, but are not limited to, alkyltrialkoxysilanes such as n-octyltrimethoxysilane, n-octyltriethoxysilane, isooctyltrimethoxysilane, dodecyltrimethoxysilane, octadecyltrimethoxysilane, propyltrimethoxysilane, and hexyltrimethoxysilane; methacryloxyalkyltrialkoxysilanes or acryloxyalkyltrialkoxysilanes such as 3-methacryloxypropyltrimethoxysilane, 3-acryloxypropyltrimethoxysilane, and 3-(methacryloxy)propyltriethoxysilane; methacryloxyalkylalkyldialkoxysilanes or acryloxyalkylalkyldialkoxysilanes such as 3-(methacryloxy)propylmethyldimethoxysilane, and 3-(acryloxypropyl)methyldimethoxysilane; methacryloxyalkyldialkylalkoxysilanes or acyrloxyalkyldialkylalkoxysilanes such as 3-(methacryloxy)propyldimethylethoxysilane; mercaptoalkyltrialkoxylsilanes such as 3-mercaptopropyltrimethoxysilane; aryltrialkoxysilanes such as styrylethyltrimethoxysilane, phenyltrimethoxysilane, phenyltriethoxysilane, and p-tolyltriethoxysilane; vinyl silanes such as vinylmethyldiacetoxysilane, vinyldimethylethoxysilane, vinylmethyldiethoxysilane, vinyltrimethoxysilane, vinyltriethoxysilane, vinyltriacetoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, and vinyltris(2-methoxyethoxy)silane; 3-glycidoxypropyltrialkoxysilane such as glycidoxypropyltrimethoxysilane; polyether silanes such as N-(3-triethoxysilylpropyl)methoxyethoxyethoxyethyl carbamate (PEG3TES), N-(3-triethoxysilylpropyl) methoxyethoxyethyl carbamate (PEG2TES), and SILQUEST A-1230); and combinations thereof.

Other suitable surface modifying agents have a nitrogen atom covalently bonded to a silicon atom. Examples include, but are not limited to, hexamethyldisilazane, di(t-butylamino)silane, 1,1,3,3,5,5-hexamethylcyclotrisilazane, and methacrylamidotrimethylsilane.

The amount of the surface modifying agent used it typically selected to provide close to a monolayer of the surface modifying agent on the surface of the inorganic oxide particles.

The amount of filler in the reaction mixture is typically in a range of 0 to 30 weight percent. Greater amounts may lead to loss of elasticity. The amount is often at least 0.1 weight percent, at least 0.5 weight percent, at least 1 weight percent, at least 2 weight percent, or at least 3 weight percent, or at least 5 weight percent and can be up to 30 weight percent, up to 25 weight percent, up to 20 weight percent, up to 15 weight percent, up to 10 weight percent, or up to 5 weight percent. The amount is often in a range of 0.1 to 30 weight percent, 0.1 to 20 weight percent, 0.1 to 10 weight percent, 0.5 to 20 weight percent, 0.5 to 10 weight percent, 0.5 to 5 weight percent, 1 to 20 weight percent, 1 to 10 weight percent, or 1 to 5 weight percent. The amount is based on the total weight of solids in the reaction mixture.

Optional Organic Solvent

The reaction mixture used to form the silicone-based elastomeric material can contain an optional organic solvent. As used herein, the term "organic solvent" refers to a non-reactive compound that is a liquid at room temperature. The organic solvent is typically added to lower the viscosity of the reaction mixture. A lower viscosity can facilitate mixing of the reaction mixture and application of the reaction mixture to a surface.

Suitable solvents are those that can dissolve the other components of the reaction mixture such as the photoinitiator, the silicone having at least two ethylenically unsaturated groups, and the optional silicone having a single ethylenically unsaturated group. The organic solvent can be polar, nonpolar, or mixture of both. Examples include, but are not limited to, various alcohols (e.g., ethanol and isopropanol), alkanes (e.g., heptane, hexane, and cyclohexane), aromatics (e.g., toluene and xylene), ketones (methyl ethyl ketone, methyl isobutyl ketone, and acetone), ethyl acetate, N,N-dimethylformamide, acetonitrile, tetrahydrofuran, dimethyl sulfoxide, hexamethyl disiloxane, and the like.

The amount of the optional organic solvent can be in a range of 0 to 30 weight percent based on a total weight of the reaction mixture. If more than this amount is used, the viscosity may be too low to apply as a coating layer. Further, using less organic solvent is typically considered preferable from a cost and environments perspective. In some embodiments, the reaction mixture contains at least 1 weight percent, at least 2 weight percent, at least 10 weight percent, or at least 15 weight percent and can include up to 30 weight percent, up to 25 weight percent, up to 20 weight percent, or up to 15 weight percent organic solvent.

Photoinitiator

The reaction mixture used to form the pressure-sensitive adhesive also includes a photoinitiator of Formula (II).

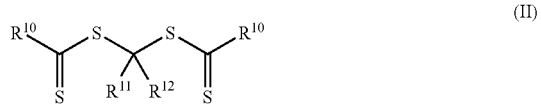
(II)

In Formula (II), each $R^{10}$ is an alkoxy, aryloxy, alkaryloxy, aralkyloxy, alkenoxy, or —$N(R^{13})_2$. Group $R^{11}$ is of formula —$(OR^{14})_p$—$OR^{15}$ with the variable p being an integer equal to at least 0 or $R^{11}$ is a group of formula —(CO)—X—$R^{16}$. Group $R^{12}$ is a hydrogen, alkyl, aryl, alkaryl, aralkyl, a group of formula —(CO)$OR^{17}$, or a group of formula —(CO)N$(R^{18})_2$. Each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R^{14}$ is an alkylene. $R^{15}$ is an alkyl and $R^{16}$ is hydrogen, alkyl, aryl, aralkyl, or alkaryl. Group $R^{17}$ is an alkyl, aryl, aralkyl, or alkaryl and each $R^{18}$ is an alkyl, aryl, aralkyl, or alkaryl. Group X is oxy or —$NR^{19}$—. Group $R^{19}$ is hydrogen, alkyl, aryl, aralkyl, or alkaryl.

In some embodiments of Formula (II), group $R^{10}$ is an alkoxy, aryloxy, aralkyloxy, alkaryloxy, or alkenoxy. Suitable alkoxy groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkoxy groups have 1 to 20 carbon atoms, 1 to 10 carbon atoms, 2 to 10 carbon atoms, 1 to 6 carbon atoms, 2 to 6 carbon atoms, or 1 to 4 carbon atoms. Suitable aryloxy groups typically have an aryl group with 5 to 12 carbon atoms, 6 to 12 carbon atoms, or 6 to 10 carbon atoms. In many embodiments, the aryl group is phenyl. Suitable aralkyloxy groups contain an aralkyl group with an alkyl group having 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The aryl group in the aralkyl group is often phenyl. The arylene group in the alkaryl group is often phenylene or biphenylene. Suitable alkaryloxy groups contain an alkaryl group having an arylene group with 5 to 12 carbon atoms, 6 to 12 carbon atoms, or 6 to 10 carbon atoms and an alkyl group with 1 to 10 carbon atoms, 1 to 6 carbon atoms, or 1 to 4 carbon atoms. The arylene group in the alkaryl group is often phenylene or biphenylene. Suitable alkenoxy groups typically have at least 2 carbon atoms, at least 3 carbon atoms, or at least 4 carbon atoms and can have up to 20 carbon atoms, up to 18 carbon atoms, up to 16 carbon atoms, up to 12 carbon atoms, up to 10 carbon atoms, or up to 6 carbons. Some example alkenoxy groups have 2 to 20 carbon atoms, 2 to 10 carbon atoms, 2 to 8 carbon atoms, 2 to 6 carbon atoms, or 2 to 4 carbon atoms.

In other embodiments of Formulas (II), group $R^{10}$ is of formula —$N(R^{13})_2$. Each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated (e.g., partially or fully unsaturated) and optionally fused to one or more second rings that are carbocyclic or heterocyclic. Suitable alkyl groups typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. When the formula —$N(R^{13})_2$ forms a first heterocyclic ring, the heterocyclic ring typically has a first ring structure with 5 to 7 ring members or 5 to 6 ring members and with 1 to 3 heteroatoms or 1 to 2 heteroatoms in the ring. If there is one heteroatom in the first ring structure, the heteroatom is nitrogen. If there are two or three heteroatoms in the first ring structure, one heteroatom is nitrogen and the any additional heteroatom is selected from nitrogen, oxygen, and sulfur. The first ring optionally can be fused to one or more second rings structure that are heterocyclic or carbocyclic and saturated or unsaturated (e.g., partially or fully unsaturated). If the second ring structure is heterocyclic, it typically has 5 to 7 or 5 to 6 ring members and 1, 2, or 3 heteroatoms selected from nitrogen, oxygen, and sulfur. If the second ring structure is carbocyclic, it is often benzene or a saturated ring having 5 or 6 ring members. In many embodiments, the heterocyclic ring has a single ring structure with 5 or 6 ring members and with either 1 or 2 heteroatoms in the ring. Examples of heterocyclic rings include, but are not limited to, morpholino, thiomorpholino, pyrrolidinyl, piperidinyl, homo-piperidinyl, indolyl, carbazolyl, imidazolyl, and pyrazolyl.

In many embodiments, $R^{10}$ is a group is an alkoxy or a group of formula $-N(R^{13})_2$ where each $R^{13}$ is an alkyl.

In some embodiments of Formula (II), group $R^{11}$ is of formula $-(OR^{14})_p-OR^{15}$. In formula $-(OR^{14})_p-OR^{15}$, the variable p is an integer equal to at least 0. Stated differently, $R^{11}$ forms an ether or polyether group with the carbon atom to which it is attached (i.e., the carbon atom between the two dithiocarbamate or dithiocarbonate groups). In many embodiments, p is equal to 0, at least 1, at least 2, or at least 3 and up to 20 or more, up to 10, up to 8, up to 6, up to 4, or up to 2. For example, p can be in a range of 0 to 20, 0 to 10, 0 to 6, 0 to 4, or 0 to 2. When p is equal to 0, $R^{11}$ is equal to a group of formula $-OR^{15}$. Group $R^{15}$ is an alkyl. Group $R^{14}$, if present, is an alkylene. Suitable alkyl and alkylene groups for $R^{14}$ and $R^{15}$ typically have at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl and alkylene groups have 1 to 20 carbon atoms, 1 to 10 carbon atoms, 2 to 10 carbon atoms, 1 to 6 carbon atoms, 2 to 6 carbon atoms, or 1 to 4 carbon atoms.

In other embodiments of Formula (II), group $R^{11}$ is of formula $-(CO)-X-R^{16}$ where $R^{16}$ is hydrogen, alkyl, aryl, aralkyl, or alkaryl and where X is oxy or $-NR^{19}-$ with $R^{19}$ being hydrogen, alkyl, aryl, aralkyl, or alkaryl. That is, $R^{11}$ is an ester or amide group. When $R^{16}$ and/or $R^{19}$ is an alkyl, the alkyl group typically has at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. When $R^{16}$ and/or $R^{19}$ is an aryl, the aryl often has 5 to 12 carbon atoms, 6 to 12 carbon atoms, or 6 to 10 carbon atoms. The aryl is often phenyl. When $R^{16}$ and/or $R^{19}$ is an alkaryl, the alkaryl group often contains an arylene group having 5 to 12 carbon atoms, 6 to 12 carbon atoms, or 6 to 10 carbon atoms and an alkyl group having 1 to 10 carbon atoms, 1 to 6 carbon atoms, or 1 to 4 carbon atoms. The arylene group in the alkaryl group is often phenylene or biphenylene. When $R^{16}$ and/or $R^{19}$ is an aralkyl, the aralkyl group often contains an alkyl group having 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The aryl group in the aralkyl group is often phenyl.

In many embodiments, $R^{11}$ is an alkoxy group ($-OR^{15}$) or a group of formula (CO)—X—$R^{16}$ where $R^{16}$ is an alkyl.

Group $R^{12}$ is a hydrogen, alkyl, aryl, aralkyl, alkaryl, a group of formula $-(CO)OR^{17}$, or a group of formula $-(CO)N(R^{18})_2$. Groups $R^{17}$ and $R^{18}$ are each an alkyl, aryl, aralkyl, alkaryl. In many embodiments, group $R^{12}$ is hydrogen. Where $R^{12}$ and/or $R^{17}$ and/or $R^{18}$ is an alkyl, the alkyl group typically has at least 1 carbon atom, at least 2 carbon atoms, at least 3 carbon atoms, or at least 4 carbon atoms and can have up to 20 carbon atoms, up to 18 carbon atoms, up to 16 carbon atoms, up to 12 carbon atoms, or up to 10 carbon atoms. Some example alkyl groups have 1 to 20 carbon atoms, 1 to 10 carbon atoms, 2 to 10 carbon atoms, 1 to 6 carbon atoms, 2 to 6 carbon atoms, or 1 to 4 carbon atoms. When $R^{12}$ and/or $R^{17}$ and/or $R^{18}$ is an aryl, the aryl often has 5 to 12 carbon atoms, 6 to 12 carbon atoms, or 6 to 10 carbon atoms. The aryl is often phenyl. When $R^{12}$ and/or $R^{17}$ and/or $R^{18}$ is an alkaryl, the alkaryl group often contains an arylene group having 5 to 12 carbon atoms, 6 to 12 carbon atoms, or 6 to 10 carbon atoms and an alkyl group having 1 to 10 carbon atoms, 1 to 6 carbon atoms, or 1 to 4 carbon atoms. The arylene group in the alkaryl group is often phenylene or biphenylene. When $R^{12}$ and/or $R^{17}$ and/or $R^{18}$ is an aralkyl, the aralkyl group often contains an alkyl group having 1 to 10 carbon atoms, 1 to 6 carbon atoms, or 1 to 4 carbon atoms and an aryl group having 5 to 12 carbon atoms, 6 to 12 carbon atoms, or 6 to 10 carbon atoms. The aryl group in the aralkyl group is often phenyl. In many embodiments, $R^{12}$ is hydrogen.

In many embodiments, $R^{12}$ is hydrogen.

The compound of Formula (II) can be formed using any suitable method. One such method is shown in Reaction Scheme G for compounds where $R^{11}$ is of formula $-(OR^{14})_p-OR^{15}$. In many such compounds, p is zero and $R^{11}$ is $-OR^{15}$.

Reaction Scheme G

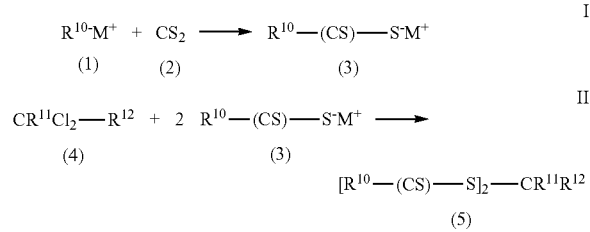

In reaction II, a compound of formula (4) is reacted with a compound of formula (3) to prepare the compound of formula (5), which corresponds to Formula (II) above. Reaction II is typically conducted at temperatures between about 0° C. and about 80° C. in the presence of an organic solvent such as acetone, acetonitrile, or an alcohol. The compound of formula (3) can be formed, for example, by treating a salt of formula (1) with carbon disulfide (Reaction I). Compound (1) is a salt of an alkoxide, aryloxide, or amine where M+ is an alkali metal, a tetralkyl ammonium ion, a trialkyl ammonium ion, or a dialkylammonium ion.

In some examples of Reaction Scheme G, compound (4) is reacted with commercially compound (3). Commercially available examples of compound (4) include, but are not limited to, dichloromethyl methyl ether, dichloromethyl butyl ether, methyl dichloromethoxyacetate. Commercially available examples of compound (3) include, but are not limited to, sodium diethyldithiocarbamate trihydrate and various xanthate salts such as potassium ethyl xanthate, sodium ethyl xanthate, potassium isopropyl xanthate, sodium isopropyl xanthate, and potassium amyl xanthate.

Another method is shown in Reaction Scheme H for compounds where $R^{11}$ is an amide or ester group of formula $-(CO)-X-R^{16}$ and $R^{12}$ is hydrogen.

Reaction Scheme H

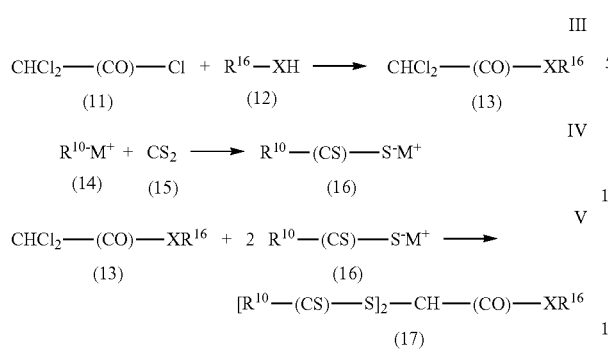

In this reaction scheme, dichloroacetyl chloride (compound (11)) is reacted (Reaction III) with a compound of formula $R^{16}$—XH (compound (12)), which is an alcohol ($R^{16}$—OH) or an amine ($R^{16}$—$NR_2H$). Reaction III often is conducted in the presence of a base such as, for example, trimethylamine and a catalyst such as, for example, pyridine or dimethylaminopyridine. Any organic solvent that is present is usually an aprotic solvent such as methylene chloride or tetrahydrofuran. The product of Reaction III is compound (13) of formula $CHCl_2$—(CO)—$XR^{16}$. Compound (13) is reacted (Reaction V) with compound (16), which can be formed by the reaction (Reaction IV) of a compound of formula $R^{10-}M^+$ (compound (14)) with carbon disulfide (15). Compound (14) is a salt of an alkoxide or of an amine where $M^+$ is usually an alkali metal ion, a tetralkyl ammonium ion, a trialkyl ammonium ion, or a dialkylammonium ion. The reaction (Reaction V) of compound (13) with compound (16) is typically conducted at temperatures between about 0° C. and about 80° C. in the presence of an organic solvent such as acetone, acetonitrile, or an alcohol.

In some examples of Reaction Scheme H, commercially available compounds of formula $CHCl_2$—(CO)—$XR^{16}$, which is compound (13), are reacted with commercially available compounds of formula $R^{10}$—(CS)—$S^-M^+$, which is compound (16). Examples of compound (13) include, but are not limited to, methyl dichloroacetate, ethyl dichloroacetate, and butyl dichloroacetate. Examples of compound (16) include, but are not limited to, sodium diethyldithiocarbamate trihydrate and various xanthate salts such as potassium ethyl xanthate, sodium ethyl xanthate, potassium isopropyl xanthate, sodium isopropyl xanthate, and potassium amyl xanthate.

In some embodiments of the photoinitiator of Formula (II), group $R^{10}$ is an alkoxy, aryloxy, alkaryloxy, aralkyloxy, or alkenoxy group. Such $R^{10}$ groups are of formula —$OR^{20}$ where $R^{20}$ is an alkyl, aryl, alkaryl, aralkyl, or alkenyl group. That is the photoinitiator is of Formula (II-1).

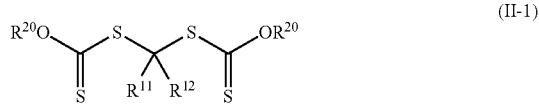

These photoinitiators are bis-dithiocarbonate compounds having a single carbon atom between the two dithiocarbonate groups.

In some other more specific compounds of Formula (II-1), $R^{20}$ is an alkenyl (i.e., —$OR^{20}$ is an alkenoxy). A specific example compound includes, but it not limited to, 1,1-bis(10-undecenyloxycarbothioylsulfanyl)methyl ether.

In other more specific compounds of Formula (II-1), $R^{20}$ is an alkyl (i.e., —$OR^{20}$ is an alkoxy), $R^{11}$ is an alkoxy ($R^{11}$ is of formula —$(OR^{14})_p$—$OR^{15}$ where p is zero, which is equal to —$OR^{15}$), and $R^{12}$ is of formula —(CO)$OR^{17}$ where $R^{17}$ is an alkyl. A specific example is methyl 2,2-bis(isopropoxycarbothioylsulfanyl)-2-methoxy-acetate.

In some embodiments of Formula (II-1), $R^{12}$ is hydrogen, $R^{11}$ is an alkoxy ($R^{11}$ is of formula —$(OR^{14})_p$—$OR^{15}$ where p is zero, which is equal to —$OR^{15}$), and $R^{10}$ is an alkoxy, aryloxy, alkaryloxy, aralkyloxy, or alkenyloxy. Such photoinitiators are of Formula (II-1A).

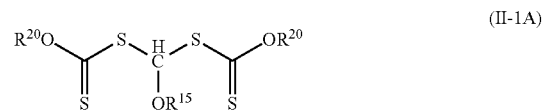

Groups $R^{20}$ is an alkyl, aryl, aralkyl, aralkyl, or alkenyl. In many embodiments of Formula (II-1A), $R^{20}$ is an alkyl. Specific example compounds include, but are not limited to, 1,1-bis(isopropoxycarbothioylsulfanyl)methyl methyl ether, 1,1-bis(isopropoxycarbothioylsulfanyl)methyl butyl ether, or 1,1-bis(ethoxycarbothioylsulfanyl)methyl butyl ether.

In other embodiments of Formula (II-1), $R^{12}$ is hydrogen, $R^{11}$ is a group of formula —(CO)—X—$R^{16}$, and $R^{10}$ is an alkoxy, aryloxy, alkaryloxy, aralkyloxy, or alkenyloxy. Such photoinitiators are of Formula (II-1B).

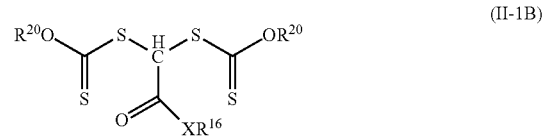

Groups $R^{20}$ is an alkyl, aryl, aralkyl, aralkyl, or alkenyl. The group $R^{20}$ is often an alkyl. Examples of compounds of Formula (II-1B) where X is equal to oxy and $R^{16}$ is an alkyl include, but are not limited to, 2-ethylhexyl 2,2-bis(isopropoxycarbothioylsulfanyl)acetate, methyl 2,2-bis(isopropoxycarbothioylsulfanyl)acetate, and tert-butyl 2,2-bis(isopropoxycarbothioylsulfanyl)acetate. An example of a compound of Formula (II-1B) where X is equal to oxy and $R^{16}$ is an aryl is phenyl 2,2-bis(isopropoxycarbothioylsulfanyl)acetate. An example of a compound of Formula (II-1B) where X is equal to —$NR^{19}$— is N,N-dibutyl-2,2-bis(isopropoxycarbothioylsulfanyl)acetamide. In this compound both $R^{16}$ and $R^{19}$ are alkyl groups.

In other embodiments of the photoinitiator of Formula (II), group $R^{10}$ is of formula —$N(R^{13})_2$.

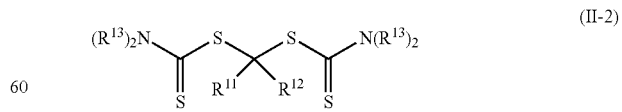

These photoinitiators are bis-dithiocarbamate compounds having a single carbon atom between the two dithiocarbonate groups.

In some embodiments of Formula (II-2), $R^{12}$ is hydrogen and $R^{11}$ is an alkoxy ($R^{11}$ is of formula —$(OR^{14})_p$—$OR^{15}$ where p is zero, which is equal to —OR$^{15}$). Such photoinitiators are of Formula (II-2A). The R$^{12}$ hydrogen is not shown in Formula (II-2A).

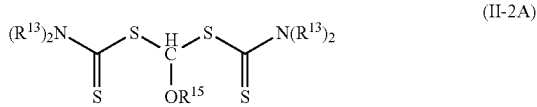

(II-2A)

In many such compounds, each R$^{13}$ is an alkyl. Specific example compounds include, but are not limited to, 1,1-bis(diethylcarbamothioylsulfanyl)methyl butyl ether and 1,1-bis(diethylcarbamothioylsulfanyl)methyl methyl ether.

In other embodiments of Formula (II-2), R$^{12}$ is hydrogen and R$^{11}$ is a group of formula —(CO)—X—R$^{16}$. Such photoinitiators are of Formula (II-2B). The R$^{12}$ hydrogen is not shown in Formula (II-2B).

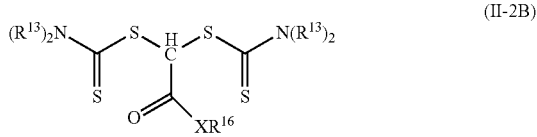

(II-2B)

The group R$^{20}$ is often an alkyl. Examples of compounds of Formula (II-2B) where X is equal to oxy and R$^{16}$ is an alkyl include, but are not limited to, 2-ethylhexyl 2,2-bis(diethylcarbamothioylsulfanyl)acetate, methyl 2,2-bis(diethylcarbamothioylsulfanyl)acetate, and octyl 2,2-bis(diethylcarbamothioylsulfanyl)acetate.

The amount of the photoinitiator of Formula (II) included in the reaction mixture impacts the weight average molecular weight of the resulting silicone-based elastomeric material. That is, the weight average molecular weight can be controlled based on the amount of photoinitiator added to the reaction mixture. The amount of photoinitiator is typically in a range of 0.001 to 5 weight percent based on the weight of polymerizable material in the reaction mixture. The polymerizable material refers to components having ethylenically unsaturated groups such as the silicone compound having at least two ethylenically unsaturated groups and optional silicone compound having a single ethylenically unsaturated group. For comparable reaction conditions, increasing the amount of photoinitiator tends to decrease the weight average molecular weight (as well as the number average molecular weight). The amount of the photoinitiator is typically at least 0.001 weight percent, at least 0.005 weight percent, at least 0.01 weight percent, at least 0.02 weight percent, at least 0.03 weight percent, or at least 0.5 weight percent and can be up to 5 weight percent, up to 3 weight percent, up to 2 weight percent, or up to 1 weight percent.

Reaction Mixture

The elastomeric material is a reaction product (i.e., polymerized product) of a reaction mixture containing (a) a silicone having at least two ethylenically unsaturated groups and (b) a photoinitiator of Formula (II) as described above. In some embodiments one or more optional components are also in the reaction mixture. Optional components include, but are not limited to, a silicone having a single ethylenically unsaturated group, a filler (e.g., inorganic oxide particles that may optionally be surface modified), and an organic solvent. The reaction mixture typically does not include a tackifier such as silicate-based tackifier (e.g., MQ resin).

Some reaction mixtures contain at least 60 weight percent of the silicone having at least two ethylenically unsaturated groups and at least 0.001 weight percent of the photoinitiator of Formula (II). The amounts are based on a total weight of solids in the reaction mixture.

The reaction mixture usually contains 40 to 99.999 weight percent of the silicone having at least two ethylenically unsaturated groups and 0.001 to 5 weight percent of the photoinitiator of Formula (II), 0 to 25 weight percent of a silicone having a single ethylenically unsaturated group, and 0 to 30 weight percent filler. The amounts are based on the total weight of solids in the reaction mixture. The solids are all components of the reaction mixture except the optional organic solvent. The reaction mixture can further include 0 to 30 weight percent organic solvent based on a total weight of the reaction mixture.

In some embodiments, the reaction mixture contains 50 to 99.999 weight percent of the silicone having at least two ethylenically unsaturated groups and 0.001 to 5 weight percent of the photoinitiator of Formula (II), 0 to 25 weight percent of a silicone having a single ethylenically unsaturated group, and 0 to 20 weight percent filler. The solids are all components of the reaction mixture except the optional organic solvent. The reaction mixture can further include 0 to 30 weight percent organic solvent based on a total weight of the reaction mixture.

In other embodiments, the reaction mixture contains 60 to 99.999 weight percent of the silicone having at least two ethylenically unsaturated groups and 0.001 to 5 weight percent of the photoinitiator of Formula (II), 0 to 25 weight percent of a silicone having a single ethylenically unsaturated group, and 0 to 10 weight percent filler. The amounts are based on the total weight of solids in the reaction mixture. The reaction mixture can further include 0 to 30 weight percent organic solvent based on a total weight of the reaction mixture.

In still other embodiments, the reaction mixture contains 60 to 99.99 weight percent of the silicone having at least two ethylenically unsaturated groups and 0.01 to 5 weight percent of the photoinitiator of Formula (II), 0 to 25 weight percent of a silicone having a single ethylenically unsaturated group, and 0 to 10 weight percent filler. For some examples, the reaction mixture can contain 70 to 99.99 weight percent of the silicone having at least two ethylenically unsaturated groups and 0.01 to 5 weight percent of the photoinitiator of Formula (II), 0 to 25 weight percent of a silicone having a single ethylenically unsaturated group, and 0 to 10 weight percent filler. In other examples, the reaction mixture contains 80 to 99.99 weight percent of the silicone having at least two ethylenically unsaturated groups and 0.01 to 5 weight percent of the photoinitiator of Formula (II), 0 to 20 weight percent of a silicone having a single ethylenically unsaturated group, and 0 to 10 weight percent filler. In still other examples, the reaction mixture can contain 90 to 99.99 weight percent of the silicone having at least two ethylenically unsaturated groups and 0.01 to 5 weight percent of the photoinitiator of Formula (II), 0 to 10 weight percent of a silicone having a single ethylenically unsaturated group, and 0 to 10 weight percent filler. The amounts are based on the total weight of solids in the reaction mixture. The reaction mixture can further include 0 to 30 weight percent organic solvent based on a total weight of the reaction mixture.

In yet other embodiments, the reaction mixture contains 60 to 98.99 weight percent of the silicone having at least two ethylenically unsaturated groups and 0.01 to 5 weight percent of the photoinitiator of Formula (II), 1 to 25 weight percent of a silicone having a single ethylenically unsaturated group, and 0 to 10 weight percent filler. The amounts are based on the total weight of solids in the reaction mixture. The reaction mixture can further include 0 to 30 weight percent organic solvent based on a total weight of the reaction mixture.

In yet other embodiments, the reaction mixture contains 60 to 98.99 weight percent of the silicone having at least two ethylenically unsaturated groups and 0.01 to 5 weight percent of the photoinitiator of Formula (II), 1 to 25 weight percent of a silicone having a single ethylenically unsaturated group, and 1 to 10 weight percent filler. The amounts are based on the total weight of solids in the reaction mixture. The reaction mixture can further include 0 to 30 weight percent organic solvent based on a total weight of the reaction mixture.

Silicone-Based Elastomeric Material and Articles

The silicone-based elastomeric material is a reaction product (i.e., polymerized product) of the above described reaction mixtures. The silicone-based elastomeric material is formed by exposing the reaction mixture to actinic radiation that is typically in the ultraviolet region of the electromagnetic spectrum.

The reaction mixture can be exposed to actinic radiation having a UVA maximum in a range of 280 to 425 nanometers. Ultraviolet light sources can be of various types. Low light intensity lights such as black lights, generally provide intensities ranging from 0.1 or 0.5 mW/cm$^2$ (milliWatts per square centimeter) to 10 mW/cm$^2$ (as measured in accordance with procedures approved by the United States National Institute of Standards and Technology as, for example, with a UVIMAP UM 365 L-S radiometer manufactured by Electronic Instrumentation & Technology, Inc., in Sterling, Va.). High light intensity sources generally provide intensities greater than 10, 15, or 20 mW/cm$^2$ ranging up to 450 mW/cm$^2$ or greater. In some embodiments, high intensity light sources provide intensities up to 500, 600, 700, 800, 900 or 1000 mW/cm$^2$. The UV light can be provided by various light sources such as light emitting diodes (LEDs), black lights, medium pressure mercury lamps, etc. or a combination thereof. Higher intensity light sources as available from Fusion UV Systems Inc. The UV exposure time for forming the elastomeric material can vary depending on the intensity of the light source(s) used. For example, complete curing with a low intensity light course can be accomplished with an exposure time ranging from about 30 to 300 seconds; whereas complete curing with a high intensity light source can be accomplished with shorter exposure time ranging from about 5 to 20 seconds. Partial curing with a high intensity light source can typically be accomplished with exposure times ranging from about 2 seconds to about 5 or 10 seconds.

The silicone-based elastomeric material that is formed using the photoinitiator of Formula (II) has different characteristics than known silicone-based elastomeric materials that are using conventional photoinitiators such as Norrish type-1 photoinitiators. For example, films of silicone-based elastomeric material tend to have surprising mechanical properties compared to those formed using Norrish type-1 photoinitiators. Examples of Norrish type-1 photoinitiators include 2-benzyl-2-(dimethylamino)-4'-morpholinobutyrophenone; 1-hydroxycyclohexyl-phenyl ketone; 2-methyl-1-[4-(methylthio)phenyl]-2-morpholinopropan-1-one; 2-hydroxy-2-methyl-1-phenylpropanone; 1-[4-(2-hydroxyethoxy)-phenyl]-2-hydroxy-2-methylpropanone; 2,2-dimethoxy-2-phenylacetophenone; acylphosphine oxide derivatives, acylphosphinate derivatives, and acylphosphine derivatives (e.g., phenylbis(2,4,6-trimethylbenzoyl)phosphine oxide (available as OMNIRAD 819 from IGM Resins, St. Charles, Ill.), phenylbis(2,4,6-trimethylbenzoyl)phosphine (e.g., available as OMNIRAD 2100 from IGM Resins), bis(2,4,6-trimethylbenzoyl)phenylphosphine oxide, 2,4,6-trimethylbenzoyldiphenylphosphine oxide (e.g., available as OMNIRAD 8953X from IGM Resins), isopropoxyphenyl-2,4,6-trimethylbenzoylphosphine oxide, dimethyl pivaloylphosphonate), ethyl (2,4,6-trimethylbenzoyl) phenyl phosphinate (e.g., available as OMNIRAD TPO-L from IGM Resins); and bis(cyclopentadienyl) bis[2,6-difluoro-3-(1-pyrryl)phenyl] titanium (e.g., available as OMNIRAD 784 from IGM Resins).

More specifically, the percent strain can be dramatically improved by replacing the conventional photoinitiators with the photoinitiators of Formula (II). For example, the percent strain can be improved by a factor of five or ten with the photoinitiators of Formula (II). The elastomeric materials are surprisingly tougher than those prepared using conventional photoinitiators as illustrated by the tensile strength data in the Example section.

While not wishing to be bound by theory, the silicone-based elastomeric materials formed using the photoinitiators of Formula (II) tend to be more highly branched and less crosslinked than silicone-based elastomeric materials prepared using conventional photoinitiators. Support for this conclusion is based on the determination of the percent extractable content of the silicone-based elastomeric material. The measurement of the percent extractable content is described in the Example section below.

The percent extractable content of the silicone-based polymeric materials formed with conventional photoinitiators tend to be no greater than 5 weight percent or no greater than 10 weight percent, which suggests that most of the silicone-based polymeric material is crosslinked. It can be difficult to obtain a silicone-based polymeric material with sufficient elasticity using conventional photoinitiators because of the high crosslinking density of the silicone-based polymeric material.

In contrast, the percent extractable content of the silicone-based elastomeric materials formed with photoinitiators of Formula (II) tends to be at least 15 weight percent, at least 25 weight percent, at least 40 weight percent, at least 50 weight percent, at least 60 weight percent, at least 75 weight percent, or at least 80 weight percent. That is the percent extractable content is often in a range of 15 to 95 weight percent, 25 to 95 weight percent, 50 to 95 weight percent, or 75 to 95 weight percent. These silicone-based elastomeric materials are more highly branched rather than crosslinked and this tends to increase the tensile strength.

The terminal groups of the various polymeric chains in the silicone-based polymeric material are typically groups of formula —S—(CS)—R$^{10}$ where R$^{10}$ is the same as defined previously. If desired, this terminal group can be replaced after the polymeric material has formed using known methods such as those described, for example, in (a) Taton et al., *Handbook of RAFT Polymerization*, Barner-Kowollik, ed., Wiley-VCH: Weinheim, 2008, p. 373, (b) Destarac et al., *Polym. Prepr. (Am. Chem. Soc., Div. Polym. Chem.)*, 2008, 49(2), (c) Destarac, *Polymer Preprints,* 2008, 49(2), page 179, and (d) Tsarevsky et al., *In Controlled Radical Polymerization: Mechanisms*, ACS Symposium Series, American Chemical Society, Washington, D C, 2015, 211-246. Suitable methods include, for example, converting the dithiocarbamate or dithiocarbonate functionality into a thiol end group through reaction with nucleophiles. The polymeric material with the thiol end group can undergo various radical reactions (e.g., radical catalyzed thiol-ene reactions and radical catalyzed thiol-yne reactions), nucleophilic reactions (e.g., thiol-ene Michael addition reactions, thiol-epoxy reactions, thiol-halide reactions, thiol-isocyanate reactions), or sulfur exchange reactions (e.g., thiol-alkanethiosulfonate reactions and thiol-pyridyl disulfide reactions). Other example methods include free-radical reductive cleavage of the dithiocarbamate or dithiocarbonate groups, oxidation with peroxide and ozone, and aminolysis using an amine or ammonia.

To form the elastomeric material that is a film or that is a layer of an article, the reaction mixture is typically applied as a layer to a substrate and exposed to actinic radiation while being supported by the substrate. The substrate can be flexible or inflexible and can be formed from a polymeric material, glass or ceramic material, metal, or combination thereof. Some substrates are polymeric films such as those prepared from polyolefins (e.g., polyethylene, polypropylene, or copolymers thereof), polyurethanes, polyvinyl acetates, polyvinyl chlorides, polyesters (polyethylene terephthalate or polyethylene naphthalate), polycarbonates, polymethyl(meth)acrylates (PMMA), ethylene-vinyl acetate copolymers, and cellulosic materials (e.g., cellulose acetate, cellulose triacetate, and ethyl cellulose). Other substrates are metal foils, nonwoven materials (e.g., paper, cloth, nonwoven scrims), foams (e.g., polyacrylic, polyethylene, polyurethane, neoprene), and the like. For some substrates, it may be desirable to treat the surface to improve adhesion to the reaction mixture or to the elastomeric material that is formed. Such treatments include, for example, application of primer layers, surface modification layer (e.g., corona treatment or surface abrasion), or both.

In some embodiments, the substrate is a release liner. Release liners typically have low affinity for the reaction mixture or for the formed silicone elastomeric material. Exemplary release liners can be prepared from paper (e.g., Kraft paper) or other types of polymeric material. Some release liners are coated with an outer layer of a release agent such as a silicone-containing material or a fluorocarbon-containing material.

The reaction mixture can be positioned next to a substrate using a roll-to-roll process. That is, the substrate can be moved from a first roll to a second roll in a continuous process. As the substrate moves between the first roll and the second roll, it can be coated with the reaction mixture. Such a substrate can be regarded as being a web and the web is often a polymeric material such as those described above. The polymeric web can be unrolled from a first roll, coated with the reaction mixture, exposed to actinic radiation (e.g., ultraviolet radiation) for polymerization (i.e., formation of the silicone elastomeric material), and then rolled onto the second roll.

The reaction mixture can have any desired thickness. The thickness of the reaction mixture is typically selected so that it can be effectively polymerized when exposed to actinic radiation (e.g., ultraviolet radiation). In many embodiments, the reaction mixture coating has a thickness no greater than 20 mils (500 micrometers), no greater than 10 mils (250 micrometers), no greater than 5 mils (125 micrometers), no greater than 4 mils (100 micrometers), no greater than 3 mils (75 micrometers), or no greater than 2 mils (50 micrometers). The thickness is often at least 0.5 mils (12.5 micrometers) or at least 1 mil (25 micrometers). For example, the thickness of the reaction mixture coating can be in the range of 0.5 mils (2.5 micrometers) to 20 mils (500 micrometers), in the range of 0.5 mils (5 micrometers) to 10 mils (250 micrometers), in the range of 0.5 mils (12.5 micrometers) to 5 mils (125 micrometers), in the range of 1 mil (25 micrometers) to 3 mils (75 micrometers), or in the range of 1 mil (25 micrometers) to 2 mils (50 micrometers).

The reaction product, which is a silicone-based elastomeric material, can be a film. Such a film can be used, for example, as a backing layer for a silicone-based pressure sensitive adhesive. That is, a silicone-based pressure sensitive adhesive layer is positioned adjacent to at least one surface of the film.

Additionally, the silicone-based elastomeric material can be used as a sealant. Further, the silicone-based elastomeric material can be used as a release material such as in a molding process.

Various embodiments are provided such as a reaction mixture, and elastomeric material formed from the reaction mixture, an article containing the elastomeric material, and a method of making the elastomeric material.

Embodiment 1A is a reaction mixture for forming an elastomeric material. The reaction mixture includes (a) a silicone having at least two ethylenically unsaturated groups and (b) a photoinitiator of Formula (II) is provided.

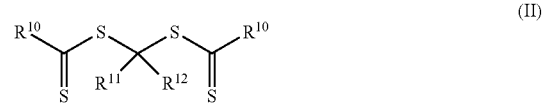

(II)

In Formula (II), each $R^{10}$ is an alkoxy, aryloxy, alkaryloxy, aralkyloxy, alkenoxy, or $-N(R^{13})_2$. Group $R^{11}$ is of formula $-(OR^{14})_p-OR^{15}$ or a group of formula $-(CO)-X-R^{16}$. Group $R^{12}$ is a hydrogen, alkyl, aryl, alkaryl, aralkyl, a group of formula $-(CO)OR^{17}$, or a group of formula $-(CO)N(R^{18})_2$. Each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R^{14}$ is an alkylene. $R^{15}$ is an alkyl and $R^{16}$ is hydrogen, alkyl, aryl, aralkyl, or alkaryl. Group $R^{17}$ is an alkyl, aryl, aralkyl, or alkaryl and each $R^{18}$ is an alkyl, aryl, aralkyl, or alkaryl. Group X is oxy or $-NR^{19}-$ and the variable p is an integer equal to at least 0. Group $R^{19}$ is hydrogen, alkyl, aryl, aralkyl, or alkaryl.

Embodiment 2A is the reaction mixture of embodiment 1A, wherein the ethylenically unsaturated groups of the silicone are (meth)acryloyl groups.

Embodiment 3A is the reaction mixture of embodiment 1A or 2A, wherein the elastomeric material has a weight percent extractable content equal to at least 15 weight percent based on the weight of the elastomeric material.

Embodiment 4A is the reaction mixture of any one of embodiments 1A to 3A, wherein the silicone having at least two ethylenically unsaturated groups is of Formula (I).

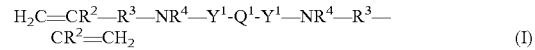

In Formula (I), $Q^1$ is a polydiorganosiloxane group; each $Y^1$ is an alkylene, arylene, aralkylene, or a combination thereof; each $R^2$ is a hydrogen or methyl; each $R^3$ is a single bond or is a divalent group that is a carbonyl, carbonylimino, carbonyloxy, imino, oxy, alkylene, alkylene substituted with a hydroxyl group, aralkylene, or a combination thereof; and each $R^4$ is hydrogen or an alkyl.

Embodiment 5A is the reaction mixture of any one of embodiments 1A to 4A, wherein $Q^1$ is of formula

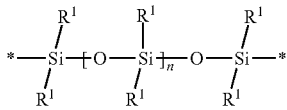

where each $R^1$ is independently an alkyl, haloalkyl, aralkyl, alkenyl, aryl, or aryl substituted with an alkyl, alkoxyl, or halo. The variable n is an integer in a range of 0 to 1500. The asterisks (*) are the location of attachment to other groups in the compound (i.e., groups $Y^1$ in the compound of Formula (I)).

Embodiment 6A is the reaction mixture of embodiment 5A, wherein at least 50 percent of the $R^1$ groups are methyl.

Embodiment 7A is the reaction mixture of embodiment 5A or 6A, wherein $Q^1$ is a polydimethylsiloxane group.

Embodiment 8A is the reaction mixture of any one of embodiments 4A to 7A, wherein $Y^1$ is an alkylene.

Embodiment 9A is the reaction mixture of any one of embodiments 4A to 8A, wherein $Y^1$ is propylene.

Embodiment 10A is the reaction mixture of any one of embodiments 4A to 9A, wherein $R^3$ is a carbonyl group.

Embodiment 11A is the reaction mixture of any one of embodiments 4A to 10A, wherein $R^3$ is —(CO)—NH—C(CH$_3$)$_2$—(CO)—, which is a combination of a carbonylimino, alkylene, and carbonyl groups.

Embodiment 12A is the reaction mixture of any one of embodiments 4A to 10A, wherein $R^3$ is —(CO)—O—CH$_2$CH$_2$—NH—(CO)—, which is a combination of carbonyloxy, alkylene and carbonylimino (or immocarbonyl) groups.

Embodiment 13A is the reaction mixture of any of embodiments 4A to 10A, wherein $R^3$ is -Ph-C(CH$_3$)$_2$—NH—(CO)—, which is a combination of an arylene, alkylene, and carbonylimino (imminocarbonyl) group.

Embodiment 14A is the reaction mixture of any one of embodiments 4A to 10A, wherein $R^3$ is —(CO)—O—CH$_2$—CH(OH)—CH$_2$—, which is a combination of carbonyloxy and an alkylene substituted with a hydroxyl group.

Embodiment 15A is the reaction mixture of any one of embodiments 1A to 14A, wherein $R^{12}$ is hydrogen and $R^{11}$ is of formula —(OR$^{14}$)$_p$—OR$^{15}$ where p is equal to zero (i.e., $R^{11}$ is of formula —OR$^{15}$).

Embodiment 16A is the reaction mixture of any one of embodiments 1A to 14A, wherein $R^{12}$ is hydrogen and $R^{11}$ is of formula —(CO)—XR$^{16}$.

Embodiment 17A is the reaction mixture of embodiment 15A or 16A, wherein the photoinitiator of Formula (II) is of Formula (II-1A) or Formula (II-1B).

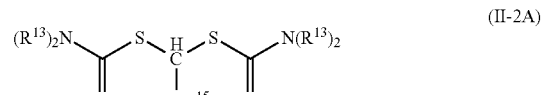

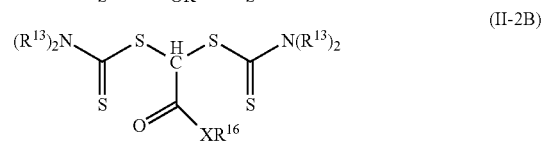

In these formulas, $R^{20}$ is an alkyl, aryl, alkaryl, aralkyl, or alkenyl; $R^{15}$ is an alkyl; $R^{16}$ is hydrogen, alkyl, aryl, aralkyl, or alkaryl; X is oxy or —NR$^{19}$—; and $R^{19}$ is hydrogen, alkyl, aryl, aralkyl, or alkaryl.

Embodiment 18A is the reaction mixture of embodiment 17A, wherein the photoinitiator is of Formula (II-1A) and $R^{20}$ is an alkyl.

Embodiment 19A is the reaction mixture of embodiment 17A, wherein the photoinitiator is of Formula (II-1B), $R^{20}$ is alkyl, $R^{16}$ is alkyl, X is oxy.

Embodiment 20A is the reaction mixture of embodiment 17A, wherein the photoinitiator is of Formula (II-1B), $R^{20}$ is alkyl, X is —NR$^{19}$—, $R^{19}$ is hydrogen or alkyl, and $R^{16}$ is alkyl.

Embodiment 21A is the reaction mixture of embodiment 15A or 16A, wherein the photoinitiator of Formula (II) is of Formula (II-2A) or Formula (II-2B).

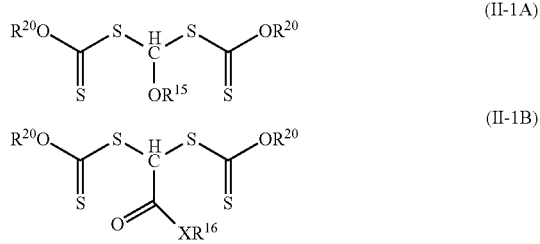

In these formulas, each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic; $R^{15}$ is an alkyl; $R^{16}$ is hydrogen, alkyl, aryl, aralkyl, or alkaryl; X is oxy or —NR$^{19}$—; and $R^{19}$ is hydrogen, alkyl, aryl, aralkyl, or alkaryl.

Embodiment 22A is the reaction mixture of embodiment 21A, wherein the photoinitiator is of Formula (II-2A) and each $R^{13}$ is an alkyl.

Embodiment 23A is the reaction mixture of embodiment 21A, wherein the photoinitiator is of Formula (II-2B), each $R^{13}$ is alkyl, X is oxy, and $R^{16}$ is alkyl.

Embodiment 24A is the reaction mixture of embodiment 21A, wherein the photoinitiator is of Formula (II-2B), each $R^{13}$ is alkyl, X is —NR$^{19}$—, $R^{19}$ is hydrogen or alkyl, and $R^{16}$ is alkyl.

Embodiment 25A is the reaction mixture of any one of embodiments 1A to 24A, wherein the reaction mixture further comprises a silicone having a single ethylenically unsaturated group.

Embodiment 26A is the reaction mixture of any one of embodiments 1A to 25A, wherein the silicone having a single ethylenically unsaturated group is of Formula (IV).

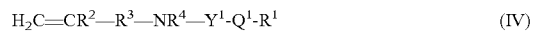

$$H_2C=CR^2-R^3-NR^4-Y^1-Q^1-R^1 \quad (IV)$$

In Formula (IV), $R^1$ is an alkyl, haloalkyl, aralkyl, alkenyl, aryl, or aryl substituted with an alkyl, alkoxyl, or halo. $Q^1$ is a polydiorganosiloxane group; each $Y^1$ is an alkylene, arylene, aralkylene, or a combination thereof; each $R^2$ is a hydrogen or methyl; each $R^3$ is a single bond or is a divalent group that is a carbonyl, carbonylimino, carbonyloxy, imino, oxy, alkylene, alkylene substituted with a hydroxyl group, aralkylene, or a combination thereof; and each $R^4$ is hydrogen or an alkyl.

Embodiment 27A is the reaction mixture of any one of embodiments 1A to 26A, wherein the reaction mixture further comprises a filler.

Embodiment 28A is the reaction mixture of any one of embodiments 1A to 27A, wherein the filler is an inorganic oxide.

Embodiment 29A, is the reaction mixture of embodiment 28A, wherein the inorganic oxide is treated with a surface modification agent.

Embodiment 30A is the reaction mixture of any one of embodiments 1A to 29A, wherein the reaction mixture comprises at least 60 weight percent of the silicone having at least two ethylenically unsaturated groups and at least 0.001 weight percent of the photoinitiator of Formula (II), where each amount is based on a total weight of solids in the reaction mixture.

Embodiment 1B is an elastomeric material that contains a reaction product of reaction mixture. The reaction mixture includes (a) a silicone having at least two ethylenically unsaturated groups and (b) a photoinitiator of Formula (II).

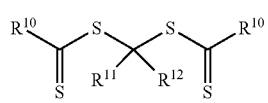

(II)

In Formula (II), each $R^{10}$ is an alkoxy, aryloxy, alkaryloxy, aralkyloxy, alkenoxy, or —$N(R^{13})_2$. Group $R^{11}$ is of formula —$(OR^{14})_p$—$OR^{15}$ or a group of formula —(CO)—X—$R^{16}$. Group $R^{12}$ is a hydrogen, alkyl, aryl, alkaryl, aralkyl, a group of formula —(CO)$OR^{17}$, or a group of formula —(CO)N$(R^{18})_2$. Each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic. Each $R^{14}$ is an alkylene. $R^{15}$ is an alkyl and $R^{16}$ is hydrogen, alkyl, aryl, aralkyl, or alkaryl. Group $R^{17}$ is an alkyl, aryl, aralkyl, or alkaryl and each $R^{18}$ is an alkyl, aryl, aralkyl, or alkaryl. Group X is oxy or —$NR^{19}$— and the variable p is an integer equal to at least 0. Group $R^{19}$ is hydrogen, alkyl, aryl, aralkyl, or alkaryl.

Embodiment 2B is the elastomeric material that contains a reaction product of any one of the reaction mixtures of embodiments 2A to 30A.

Embodiment 1C is an article comprising an elastomeric material of embodiment 1B or 2B.

Embodiment 2C is the article of embodiment 1C, wherein the elastomeric material is a film.

Embodiment 3C is the article of embodiment 2C, further comprising a silicone-based pressure-sensitive adhesive layer adjacent to the film.

Embodiment 1D is a method of making an elastomeric material. The method includes providing a reaction mixture of any one of embodiments 1A to 30A and exposing the reaction mixture to actinic radiation to form a silicone-based elastomeric material.

Examples

Materials

| Name or Abbreviation | Description |
| --- | --- |
| I651 | Refers to 2,2-Dimethoxy-1,2-diphenylethan-1-one, which is available under the trade designation IRGACURE 651 from Ciba Specialty Chemicals, Tarrytown, NY (USA). |
| APTPDMS | refers to aminopropyl terminated polydimethylsiloxane that was prepared according to U.S. Pat. No. 5,214,119 (Leir et al.) with a number average molecular weight of about 33,000 grams/mole. |
| Vinyl azlactone | refers to 4,4-dimethyl-2-vinyl 2-oxazolin-5-one, which is available from Polysciences Incorporated, Warrington, PA (USA). |
| Potassium isopropyl xanthate | A compound that is available from TCI America, Portland, OR (USA). |
| 2-Isocyanato ethyl methacrylate | A monomer that is available from Sigma Aldrich Corporation, St. Louis, MO (USA). |
| 3-Isopropenyl-alpha, alpha-dimethylbenzyl isocyanate | A compound that is available from Sigma Aldrich Corporation, St. Louis, MO (USA). The compound has a molecular weight of 201.3 grams/mole and a boiling point of 268-271° C. (based on literature). |
| Methyl dichloroacetate | A compound that is available from Sigma Aldrich Corporation, St. Louis, MO (USA). |
| Dichloromethyl methyl ether | A compound that is available from TCI America, Portland, OR (USA). |
| 2-Ethylhexanol | A compound that is available from Sigma Aldrich Corporation, St. Louis, MO (USA). |
| Dimethylaminopyridine | A compound that is available under product code 107700 from Sigma Aldrich Corporation, St. Louis, MO (USA). |
| Dichloroacetyl chloride | A compound that is available from Sigma Aldrich Corporation, St. Louis, MO (USA). |
| Monomethacryloxypropyl terminated polydimethylsiloxane (MM-PDMS) | A silicone having a single methacryloyl group that is available from Gelest, Incorporated, Morrisville, PA. |
| Hexamethyldisilazane treated fumed silica particles | Treated fumed silica that is available from Gelest, Incorporated, Morrisville, PA. |

Test Methods

Tensile Strength and Elongation

Tensile strength and elongation at failure were measured according to ASTM D638-14 using a model MTS Alliance 100 Tensile Tester (MTS System Corporation, Eden Prairie, Minn.) and load cell capacity of 25.0 Newtons. Test specimens measuring 12 millimeters wide, 50 millimeters long, and having a thickness of approximately 0.025 centimeters were evaluated at strain rate of 25.4 centimeters/minute. Two or three specimens were evaluated and the average tensile strength and elongation values were reported.

Percent Extractable Content

The amount of unreacted silicone material remaining in a silicone film after exposure to UV light was measured immediately after the film was irradiated follows. Three circular test specimens, each having a diameter of 3.69 centimeters and thickness of approximately 0.010 inch (0.025 centimeters), were cut from the film substrate across its width in an evenly spaced manner and were weighed to determine their initial weights. Next, the specimens were immersed in methyl isobutyl ketone (100 grams) for 24 hours, then removed using tweezer and allowed to air dry for about 12 hours. After drying, the final weights were determined. The change in weight was used to calculate a Weight Percent Extractable Content as follows:

[(Initial Weight−Final Weight)/Initial Weight]×100

The average of the three results was reported.

NMR Analysis

Approximately 50 to 100 milligrams of a photoinitiator was dissolved in approximately 1 mL of deuterated chloroform and proton NMR spectra were acquired on a Bruker AVANCE III 500 MHz spectrometer.

Preparation of Sodium Isopropyl Xanthate (SIX)

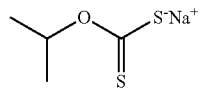

Isopropanol, 871.1 grams (14.49 moles), in a flask equipped with a mechanical stirrer, was purged with nitrogen. Sodium metal cubes (20.25 grams, 0.88 moles, Sigma-Aldrich, St. Louis, Mo., USA) were cut into small pieces and added to the flask over a period of three hours. The temperature was then increased to 65° C. The sodium dissolved with evolution of hydrogen over three additional hours resulting in a clear solution. The mixture was then cooled to 35° C. using an ice bath, to provide a thick slurry. Carbon disulfide (73.80 grams, 0.97 moles) was added slowly over 30 minutes to the slurry followed by stirring for an additional 30 minutes to give a yellow solution. Solvent removal under vacuum gave a yellow solid that was further dried under high vacuum (1-millimeter Hg) for four hours. A yellow powder (136.7 grams), sodium isopropyl xanthate, was obtained.

Preparation of Methyl-2,2-bis(isopropoxycarbothioylsulfanyl)acetate (PI 1)

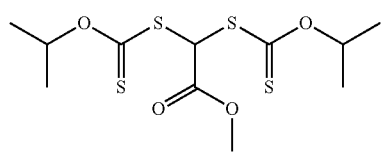 [SMILES: COC(=O)C(SC(=S)OC(C)C)SC(=S)OC(C)C]

A solution of methyl dichloroacetate (7.15 grams, 50.0 millimoles) dissolved in 250 milliliters of acetone was treated with potassium isopropyl xanthate (17.5 grams, 100 millimoles) and the reaction mixture was stirred overnight at room temperature. The reaction mixture was then filtered through a plug of silica gel in a small pipette, washed once with acetone, and the filtrate was concentrated down using a rotary evaporator to give a brown syrup. Purification by column chromatography (silica column using an eluent gradient of 18:82 (v:v)/methylene chloride:hexanes to 50:50 (v:v)/methylene chloride:hexanes) gave 11.5 grams of methyl-2, 2-bis(isopropoxycarbothioylsulfanyl) acetate, designated herein as PI 1, as an amber colored syrup. $^1$H NMR (CDCl3, 500 MHz): δ 6.03 (s, 1H), 5.73 (m, 2H), 3.82 (s, 3H), 1.42 (d, J=6.3 Hz, 6H), 1.40 (d, J=6.3, 6H).

Preparation of 2-ethylhexyl 2,2-dichloroacetate

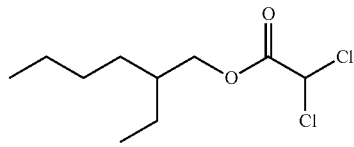

A solution of 2-ethylhexanol (3.00 grams, 23.0 mmol) in 50 mL of $CH_2Cl_2$ was cooled to 0° C. under nitrogen. To the solution were added trimethylamine (4.80 mL, 34.4 mmol) and dimethylaminopyridine (20 mg). This was followed by the dropwise addition of dichloroacetyl chloride (3.74 grams, 25.4 mmol). The reaction mixture was allowed to reach ambient temperature while stirring overnight. The reaction mixture was quenched with a saturated solution of $NaHCO_3$ followed by addition of 50 mL of $CH_2Cl_2$. The layers were separated and the organic portion was washed with 5 weight percent $NaH_2PO_4$ (2×) followed by brine. The organic portion was dried over $Na_2SO_4$, filtered through a small plug of silica gel, and concentrated under reduced pressure to yield 5.02 grams of 2-ethylhexyl 2,2-dichloroacetate as a yellow liquid.

Preparation of 2-Ethylhexyl-2,2-bis(isopropoxycarbothioylsulfanyl)acetate (PI 2)

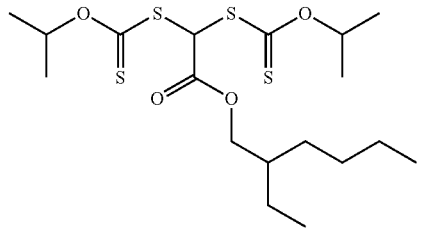 [SMILES: CCCCC(CC)COC(=O)C(SC(=S)OC(C)C)SC(=S)OC(C)C]

A solution of 2-ethylhexyl 2,2-dichloroacetate (7.14 grams, 29.6 millimoles) dissolved in 150 mL of acetone was treated with potassium isopropyl xanthate (10.3 grams, 59.3 millimoles) and the reaction mixture was stirred overnight at room temperature. The reaction mixture was filtered and washed once with acetone. The filtrate was concentrated down to give a brown syrup. Purification by column chromatography (silica gel, 100 volume percent hexanes to 40:60 (v:v)/methylene chloride:hexanes) gave 9.3 grams of 2-ethylhexyl 2,2-bis(isopropoxycarbothioylsulfanyl)acetate, designated herein as PI 2, as an amber colored liquid. $^1$H NMR (CDCl₃, 500 MHz) δ 6.05 (s, 1H), 5.73 (m, 2H), 4.10 (m, 2H), 1.61 (m, 1H), 1.42 (d, J=6.3 Hz, 6H), 1.40 (d, J=6.3, 6H), 1.37 (m, 2H), 1.34-1.26 (m, 6H), 0.89 (t, J=6.9, 3H), 0.89 (t, J=7.4, 3H).

Preparation of
1,1-bis(isopropoxycarbothioylsulfanyl)methyl
methyl ether (PI 3)

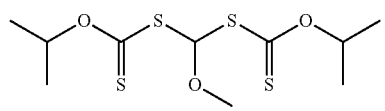 [SMILES: COC(SC(=S)OC(C)C)SC(=S)OC(C)C]

A mixture of SIX (7.57 grams, 48 millimoles) and acetone (30 milliliters) was cooled using an ice bath. A solution of dichloromethyl methyl ether (2.50 grams, 22 millimoles, TCI America, Portland, Oreg., USA) in acetone (5 milliliters) was added slowly over 15 minutes. After stirring at room temperature for three hours, the solvent was removed under vacuum. Ethyl acetate (30 milliliters) was added and the mixture was washed with water two times. The organic phase was concentrated under vacuum and the residual oil was purified by column chromatography over silica gel (1 to 15% ethyl acetate in hexanes). A yellow oil, 1,1-bis(isopropoxycarbothioylsulfanyl)methyl methyl ether designated herein as PI 3, was isolated (5.82 grams). Proton NMR gave the following results: 7.06 (s, 1H), 5.76 (m, 2H), 3.54 (s, 3H), 1.40-1.41 (m, 12H).

Preparation of Acrylamido Terminated Silicone
(Silicone 1)

APTPDMS (100 grams) and vinyl azlactone (0.80 grams) were added together in a 200-gram glass jar and mixed on a rotating roller for 10 hours at the rate of 40 rolls/minute to yield 95 grams (95 percent yield) of acrylamido terminated silicone, designated herein as Silicone 1. Silicone 1 was prepared according to Reaction Scheme B above.

Preparation of Methacryloxy-Urea Terminated
Silicone (Silicone 2)

APTPDMS (100 grams) and 2-isocyanato ethyl methacrylate (0.87 grams) were added together in a 200-gram glass jar and mixed on a rotating roller for 24 hours at the rate of 40 rolls/minute to yield 92 grams (92 percent yield) of methacryloxy-urea terminated silicone, designated herein as Silicone 2. Silicone 2 was prepared according to Reaction Scheme C above.

Preparation of Methylstyryl-Urea Terminated
Silicone (Silicone 3)

APTPDMS (100 grams) and 3-isopropenyl-alpha, alpha-dimethylbenzyl isocyanate (1.12 grams) were added together in a 200-gram glass jar and mixed on a rotating roller for 10 hours at the rate of 40 rolls/minute to yield 92 grams (92% yield) of methylstyryl urea terminated silicone, designated herein as Silicone 3. Silicone 3 was prepared according to Reaction Scheme D above.

Preparation of Silicone Films (CE-1 and EX-1 to
EX-7)

Silicone materials and photoinitiators were added together in a glass jar and mixed on a rotating roller for 24 hours at the rate of 40 rolls/minute using the materials and amounts (in grams) shown in Table 1. The resulting compositions were coated between two sheets of 0.002 inch (51 micrometers) thick polyester film using a knife-over-bed coater to provide a coating thickness of approximately thickness of 0.10 inch (0.025 centimeters). The coatings were then cured by UV irradiation using a UVP Black Ray Lamp Model XX-15L (UVP, LLC, Upland, Calif., USA) having a maximum emission at 350 nanometers for between 20 and 25 minutes to provide a total energy of between 2000 and 2500 milliJoules/square centimeter. Free-standing silicone films were obtained after irradiation by removing the polyester films. These were evaluated as described above. The results are shown in Table 2.

TABLE 1

Compositions

| Example | Silicone 1 | Silicone 2 | Silicone 3 | PI 1 | PI 2 | PI 3 | I65 1 |
|---|---|---|---|---|---|---|---|
| CE-1 | 10.0 | 0.0 | 0.0 | 0.000 | 0.000 | 0.000 | 0.128 |
| EX-1 | 10.0 | 0.0 | 0.0 | 0.160 | 0.000 | 0.000 | 0.000 |
| EX-2 | 10.0 | 0.0 | 0.0 | 0.160 | 0.000 | 0.000 | 0.012 |
| EX-3 | 10.0 | 0.0 | 0.0 | 0.160 | 0.000 | 0.000 | 0.128 |
| EX-4 | 10.0 | 0.0 | 0.0 | 0.000 | 0.16 | 0.000 | 0.000 |
| EX-5 | 10.0 | 0.0 | 0.0 | 0.000 | 0.000 | 0.160 | 0.000 |
| EX-6 | 0.0 | 10 | 0.0 | 0.160 | 0.000 | 0.000 | 0.000 |
| EX-7 | 0.0 | 0.0 | 10 | 0.160 | 0.000 | 0.000 | 0.000 |

TABLE 2

Results

| Example | Tensile Strength (MegaPascals) | Tensile Elongation (%) | Extractable Content (%) |
|---|---|---|---|
| CE-1 | 0.18 | 106 | 5 |
| EX-1 | 10.6 | 509 | 84 |
| EX-2 | 4.4 | 317 | 51 |
| EX-3 | 1.8 | 191 | 16 |
| EX-4 | 8.0 | 417 | 80 |
| EX-5 | 5.8 | 457 | 83 |
| EX-6 | 5.2 | 361 | 80 |
| EX-7 | 3.3 | 250 | 66 |

Preparation of Silicone Films with Fillers (EX-8)

Silicone 1 (10 grams), PI-1 (0.160 grams) and hexamethyldisilazane treated fumed silica particles (1.0 grams) were added together in a glass jar and mixed on a rotating roller for 24 hours at the rate of 40 rolls/minute using the materials and amounts (in grams) shown in Table 1. The resulting compositions were coated between two sheets of 0.002 inch (51 micrometers) thick polyester film using a knife-over-bed coater to provide a coating thickness of approximately thickness of 0.10 inch (0.025 centimeters). The coatings were then cured by the same as described above. Free-standing silicone films were obtained after irradiation by removing the polyester films.

Preparation of Silicone Films with
Mono-Functional Silicone (EX-9)

Silicone 1 (10 grams), PI-1 (0.160 grams) and MM-PDMS (1.0 grams) were added together in a glass jar and mixed on a rotating roller for 24 hours at the rate of 40 rolls/minute using the materials and amounts (in grams)

shown in Table 1. The resulting compositions were coated between two sheets of 0.002 inch (51 micrometers) thick polyester film using a knife-over-bed coater to provide a coating of approximately thickness of 0.10 inch (0.025 centimeters). The coatings were then cured by the same as described above. Free-standing silicone films were obtained after irradiation by removing the polyester films. The films were tacky to touch.

What is claimed is:

1. An elastomeric material comprising a reaction product of reaction mixture comprising:
   a) a silicone having at least two ethylenically unsaturated groups, the silicone being of Formula (I)

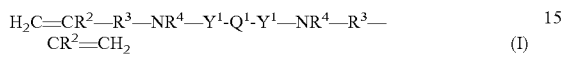

wherein
   $Q^1$ is a polydiorganosiloxane group;
   each $Y^1$ is an alkylene, arylene, aralkylene, or a combination thereof;
   each $R^2$ is a hydrogen or methyl;
   each $R^3$ is a single bond or is a divalent group that is a carbonyl, carbonylimino, carbonyloxy, imino, oxy, alkylene, alkylene substituted with a hydroxyl group, aralkylene, or a combination thereof; and
   each $R^4$ is hydrogen or an alkyl; and
   b) a photoinitiator of Formula (II)

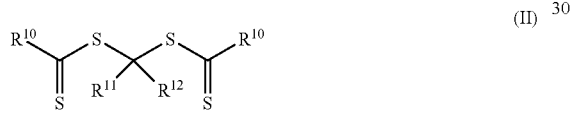

wherein
   each $R^{10}$ is an alkoxy, aryloxy, alkaryloxy, aralkyloxy, alkenoxy, or $N(R^{13})_2$;
   $R^{11}$ is a group of formula $-(OR^{14})_p-OR^{15}$ or a group of formula $-(CO)-X-R^{16}$;
   $R^{12}$ is a hydrogen, alkyl, aryl, aralkyl, alkaryl, a group of formula $-(CO)OR^{17}$, or a group of formula $-(CO)N(R^{18})_2$;
   each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic;
   each $R^{14}$ is an alkylene;
   $R^{15}$ is an alkyl;
   $R^{16}$ is hydrogen, alkyl, aryl, aralkyl, or alkaryl;
   $R^{17}$ is an alkyl, aryl, aralkyl, or alkaryl;
   each $R^{18}$ is an alkyl, aryl, aralkyl, or alkaryl;
   X is oxy or $-NR^{19}-$;
   $R^{19}$ is hydrogen, alkyl, aryl, aralkyl, or alkaryl; and
   p is an integer equal to at least 0.

2. The elastomeric material of claim 1, wherein the ethylenically unsaturated groups of the silicone are (meth)acryloyl groups.

3. The elastomeric material of claim 1, wherein the elastomeric material has a weight percent extractable content equal to at least 15 weight percent based on the weight of the elastomeric material.

4. The elastomeric material of claim 1, wherein $Q^1$ is a polydimethylsiloxane.

5. The elastomeric material of claim 1, wherein the photoinitiator of Formula (II) is of Formula (II-1A) or Formula (II-1B)

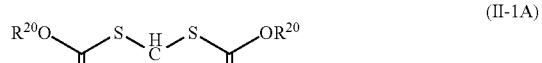

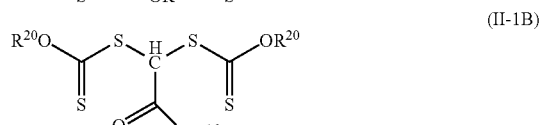

wherein
$R^{20}$ is an alkyl, aryl, alkaryl, aralkyl, or alkenyl; and
$R^{15}$ is an alkyl;
$R^{16}$ is hydrogen, alkyl, aryl, aralkyl, or alkaryl;
X is oxy or $-NR^{19}-$; and
$R^{19}$ is hydrogen, alkyl, aryl, aralkyl, or alkaryl.

6. The elastomeric material of claim 5, wherein $R^{20}$ is alkyl, $R^{16}$ is alkyl, and X is oxy.

7. The elastomeric material of claim 1, wherein the photoinitiator of Formula (II) is of Formula (II-2A) or Formula (II-2B)

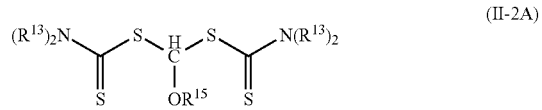

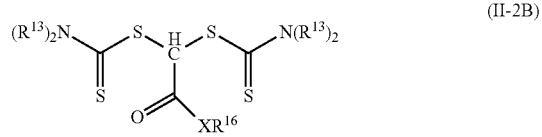

wherein
each $R^{13}$ is an alkyl or two adjacent $R^{13}$ groups are combined with the nitrogen to which they are both attached to form a first heterocyclic ring having 1 to 3 heteroatoms selected from nitrogen, oxygen, and sulfur, the first heterocyclic ring being saturated or unsaturated and optionally fused to one or more second rings that are carbocyclic or heterocyclic;
$R^{15}$ is an alkyl;
$R^{16}$ is hydrogen, alkyl, aryl, aralkyl, or alkaryl;
X is oxy or $-NR^{19}-$; and
$R^{19}$ is hydrogen, alkyl, aryl, aralkyl, or alkaryl.

8. The elastomeric material of claim 7, wherein each $R^{13}$ is alkyl, $R^{1'}$ is alkyl, and X is oxy.

9. The elastomeric material of claim 1, wherein the reaction mixture further comprises a silicone having a single ethylenically unsaturated group.

10. The elastomeric material of claim 1, wherein the reaction mixture further comprises a filler.

11. The elastomeric material of claim 1, wherein the reaction mixture comprises at least 60 weight percent of the silicone of Formula (I) and at least 0.001 weight percent of the photoinitiator of Formula (II), where each amount is based on a total weight of solids in the reaction mixture.

12. An article comprising the elastomeric material of claim 1.

13. The article of claim 12, wherein the article is a film.

14. The article of claim 12, further comprising a silicone-based pressure-sensitive adhesive layer adjacent to the film.

\* \* \* \* \*

UNITED STATES PATENT AND TRADEMARK OFFICE
CERTIFICATE OF CORRECTION

Page 1 of 1

PATENT NO. : 10,836,934 B2
APPLICATION NO. : 16/648764
DATED : November 17, 2020
INVENTOR(S) : Jitendra Rathore It is certified that error appears in the above-identified patent and that said Letters Patent is hereby corrected as shown below:

In the Specification

Column 9
Line 48, Delete "IV" and insert -- $R^1$ --, therefor.

In the Claims

Column 34
Line 54, In Claim 8, delete "$R^1$" and insert -- $R^{16}$ --, therefor.

Signed and Sealed this
Second Day of February, 2021

Drew Hirshfeld
*Performing the Functions and Duties of the
Under Secretary of Commerce for Intellectual Property and
Director of the United States Patent and Trademark Office*